(12) United States Patent
Kaufhold et al.

(10) Patent No.: US 7,653,229 B2
(45) Date of Patent: Jan. 26, 2010

(54) METHODS AND APPARATUS FOR RECONSTRUCTION OF VOLUME DATA FROM PROJECTION DATA

(75) Inventors: John Patrick Kaufhold, Schenectady, NY (US); Bernhard Erich Hermann Claus, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 1310 days.

(21) Appl. No.: 10/744,882

(22) Filed: Dec. 23, 2003

(65) Prior Publication Data

US 2005/0135664 A1    Jun. 23, 2005

(51) Int. Cl.
*G06K 9/00* (2006.01)
*G01N 23/00* (2006.01)

(52) U.S. Cl. .................... 382/131; 382/154; 378/21
(58) Field of Classification Search ......... 382/128–134, 382/154; 378/21–27
See application file for complete search history.

(56) References Cited

U.S. PATENT DOCUMENTS

| | | | |
|---|---|---|---|
| 5,588,032 A | * | 12/1996 | Johnson et al. ............. 378/8 |
| 5,872,828 A | | 2/1999 | Niklason et al. |
| 6,632,020 B2 | | 10/2003 | Kaufhold et al. |
| 6,674,835 B2 | | 1/2004 | Kaufhold et al. |
| 6,754,298 B2 | * | 6/2004 | Fessler ..................... 378/4 |

OTHER PUBLICATIONS

U.S. Appl. No. 11/805,369, filed May 23, 2007, Claus et al.
John P. Kaufhold, Energy Formulations of Medical Image Segmentations, Aug. 11, 2000, Boston University College of Engineering Department of Biomedical Engineering Doctoral Thesis.

* cited by examiner

*Primary Examiner*—Wesley Tucker
(74) *Attorney, Agent, or Firm*—Patrick K. Patnode

(57) ABSTRACT

Some configurations of method for reconstructing a volumetric image of an object include obtaining a tomosynthesis projection dataset of an object. The method also includes utilizing the tomosynthesis projection dataset and additional information about the object to minimize a selected energy function or functions to satisfy a selected set of constraints. Alternatively, constraints are applied to a reconstructed volumetric image in order to obtain an updated volumetric image. A 3D volume representative of the imaged object is thereby obtained in which each voxel is reconstructed and a correspondence indicated to a single one of the component material classes.

127 Claims, 6 Drawing Sheets

METHODS AND APPARATUS FOR RECONSTRUCTION OF VOLUME DATA FROM PROJECTION DATA

BACKGROUND OF THE INVENTION

This invention relates generally to methods and apparatus for tomosynthetic volume reconstruction (creating a volumetric image from projections) and more particularly to methods and apparatus for reconstructing volumes from tomosynthesis projection images such that the intensities in the reconstructed volume correspond quantitatively to a number of selected material classes.

In at least one known medical imaging method, radiological interpretation of two-dimensional projection radiographs of a breast volume is used in combination with image processing techniques that aim solely at optimizing the quality of the displayed projection images. In standard mammography (i.e., standard projection radiography of the breast) the radiologist has only limited information available for projection image interpretation. Structures that exist at distinct physical locations in the imaged breast can appear superimposed on the projection radiograph, thereby hiding lesions, or the superimposition of normal structures can mimic the appearance of cancerous lesions. In addition, there is no absolute scale of the gray values within the image, so that a radiologist must rely on his or her experience to interpret projection images and to attribute projection image content to locally varying tissue composition and/or thickness.

Qualitatively, brighter regions of the projection image correspond to detected x-ray beams that passed through an increased tissue thickness, or relatively higher fraction of glandular tissue. Darker regions correspond to detected x-ray beams which passed through a reduced tissue thickness, or a relatively higher fraction of fatty tissue. Furthermore, the appearance of the projection image depends on the x-ray technique that was used in the image acquisition, as well as any image processing steps.

Tomosynthesis is a 3D x-ray imaging technique in which a 3D volumetric image is reconstructed from a few projection radiographs of an object, where the projection radiographs are typically acquired for different x-ray tube positions over a small angular range relative to the imaged object. The reconstructed 3D volumetric image provides information about the three-dimensional location, shape, and extent of structures within the imaged breast. Thus, reconstructed volumetric images in tomosynthesis may alleviate problems of interpreting overlapping tissue. However, while current reconstruction and image processing approaches aim at obtaining a good image quality for the reconstructed 3D volumetric image, maybe targeting a specific display mode, an absolute quantitative relationship between voxel intensities (in the 3D reconstructed volumetric image) and material composition (e.g., of breast tissue) is not currently available.

BRIEF DESCRIPTION OF THE INVENTION

Some configurations of the present invention therefore provide a method for reconstructing a volumetric image of an object. The method includes obtaining a tomosynthesis projection dataset of an object, wherein the tomosynthesis projection dataset includes a plurality of projection radiographs of an imaged object obtained at different angles. The method also includes utilizing the tomosynthesis projection dataset and additional information about the object to minimize a selected energy function or functions to jointly satisfy or arbitrate among a selected set of constraints. A 3D volumetric image representative of the imaged object is thereby obtained in which each voxel in the volumetric image corresponds to a single material class. As used herein a material class is defined as a class that includes any type of material within a range of radiographically equivalent attenuation properties.

Also, some configurations of the present invention provide a method for reconstructing a volumetric image of an object, in which a projection dataset of an object is acquired and the projection radiographs are preprocessed to produce quantitative projections. In the quantitative projections, the pixel intensities in each quantitative projection correspond to an amount of material each x-ray passed through in its path from the x-ray source to the detector pixel. The method further includes performing an initial reconstruction, and choosing an energy definition to minimize, wherein the energy definition includes a term that constrains the reconstructed volumetric image to an N-ary or approximately N-ary composition of material classes (where N-ary indicates that each voxel is one of N material classes).

In yet other aspects, the present invention provides a method for reconstructing a volumetric image of a breast. The method includes acquiring a tomosynthesis projection dataset that includes a set of projection radiographs of a breast from different projection angles. A geometry of a three-dimensional volume that contains breast tissue is estimated to produce an air/tissue volumetric image of an imaged breast, and thereby a volumetric image of the breast hull. Radiation pathlengths through breast tissue are determined for each projection radiograph in the tomosynthesis projection dataset. The method further includes using the determined radiation pathlengths and tomosynthesis projection dataset to estimate a percentage or amount of glandular-equivalent breast tissue material class for each projection radiograph, so that the estimate thereby produces a set of quantitative projections. In addition, the method includes determining an overall percentage glandular-equivalent tissue for a plurality of x-ray projection radiographs using the quantitative projections, and using the set of quantitative projections to estimate volumetric intensities in the breast hull. The estimated volumetric image intensities are utilized to determine an N-ary or almost N-ary volumetric image of the breast, wherein at least most voxels of the volumetric image are labeled as one of the member of the set of tissues including fatty tissue and glandular-equivalent tissue.

In yet another aspect, the present invention provides an apparatus for producing a reconstructed volumetric image of an object. The apparatus includes a radiation source, a detector, an image processor and a computer. The image processor is not necessarily a separate component from the computer. The apparatus is configured to obtain a tomosynthesis projection dataset of an object. The apparatus is further configured to utilize the tomosynthesis projection dataset and additional information about the object to minimize a selected energy function or functions to jointly satisfy and/or arbitrate among a selected set of constraints. In so doing, a volumetric image is obtained in which each voxel is assigned a specific component material class.

In yet another configuration, the present invention provides an apparatus for producing a volumetric image of an object. The apparatus includes a radiation source, a detector, an image processor and a computer. The image processor is not necessarily a separate component from the computer. The apparatus is configured to acquire a tomosynthesis projection dataset of an object and preprocess the tomosynthesis projection dataset to produce quantitative projections. The apparatus is further configured to perform an initial reconstruction. The initial reconstructed volumetric image may be used to choose an energy definition to minimize, wherein the energy definition includes a term that constrains the reconstructed volume to an N-ary or approximately N-ary composition.

In yet other aspects, the present invention provides an apparatus for producing a reconstructed volumetric image of a breast. The apparatus includes a radiation source, a detector, an image processor and a computer, although the image processor is not necessarily a separate component from the computer. The apparatus is configured to acquire a tomosynthesis projection dataset including a set of projection radiographs of a breast from different projection angles, and estimate a geometry of a three-dimensional volume that contains breast tissue to produce an air/tissue volumetric image of an imaged breast, and thereby a volumetric image of the breast hull. Radiation pathlengths through the breast tissue are determined for each projection radiograph in the tomosynthesis projection dataset, and determined radiation pathlengths and the tomosynthesis projection dataset are used to estimate a percentage or amount of glandular-equivalent breast tissue composition for each projection radiograph. The apparatus thereby produces a set of quantitative glandular projection estimates. The apparatus is further configured to determine an overall percentage glandular tissue for a plurality of x-ray projection radiographs using the quantitative projections and to use the set of quantitative projections to estimate volumetric image intensities in the breast hull. The apparatus is also configured to utilize the estimated volumetric image intensities to determine an N-ary or almost N-ary reconstruction of a volumetric image of the breast. At least most voxels of the volumetric image are labeled as one or the other member of the set of tissues including fatty tissue and glandular tissue.

It will be appreciated that configurations of the present invention are able to generate volumetric images that provide three-dimensional localized quantitative tissue characteristics and classification in addition to qualitative information about three-dimensional location, shape, and extent of structures (for example, mammographic structures) provided by tomosynthesis.

Quantitative information incorporated into three-dimensional volumetric images in various configurations of the present invention adds significant diagnostic value to a reconstructed volume while also providing collateral constraints to aid in management of reconstruction artifacts. Furthermore, in some medical applications, the reconstructed three-dimensional volumetric image of an imaged breast or other structure can be expressed in terms of its constituent tissue types. As a result, reconstructed volumetric images are completely independent of the X-ray technique used to acquire the corresponding tomosynthesis projection dataset. X-ray technique-independent volumes can be used for making comparisons between volumes reconstructed from datasets acquired on different dates, for example.

Some of the configurations of the present invention are not limited to breast image reconstruction or to medical applications in general, but rather can be used for quantitative reconstruction of an image of any object having a plurality of constituent material classes.

DETAILED DESCRIPTION OF THE INVENTION

Example embodiments of systems that facilitate imaging of objects are described below in detail. Technical effects of the systems and processes described herein include at least one of facilitating the display of a three-dimensional image of an object and automating display of information therein in the form of three-dimensional composition information. Although displaying a 3D volume is one technical effect, the 3D volume can also be fed directly into a computer aided diagnosis (CAD) algorithm, or further processed, irrespective of whether a three-dimensional image is displayed. Technical effects are required to be discussed per the GE manual. Of course, this paragraph can be placed anywhere in the application itself.

The term "material classes" refers to the different classes of materials that are utilized in a reconstruction. Each material class can contain exactly one material or a range of materials, where "range" is associated with a range of attenuation values that encompasses the materials in the class.

The term "material" refers to a class of radiographically equivalent tissues. (For example, "glandular material" is equivalent to the class of tissue types that are radiographically equivalent to fibroglandular tissue. Glandular tissue, e.g., comprises several tissue types, namely, fibroglandular, cancerous, Cooper's ligaments, etc.) "Radiographically equivalent tissues" as used herein, could be substituted with one another without changing a radiographic (e.g., x-ray) image, up to statistical effects.

A material class can include a range of materials. For example, the class of materials having attenuation lower than or equal to fat contains both fat and air.

As used herein, the terms "projection image" and "image" refer to projections or projection radiographs, which may be appropriately processed. Projection images used herein include the tomosynthesis projection dataset, pi(u,v), the quantitative projections, qi(u,v), and the reprojections, ri(u,v). In some development, the variable, y, may indicate the continuous projection counterpart to any of the pixelized projection images, pi(u,v), qi(u,v), or ri(u,v).

Figure 3:
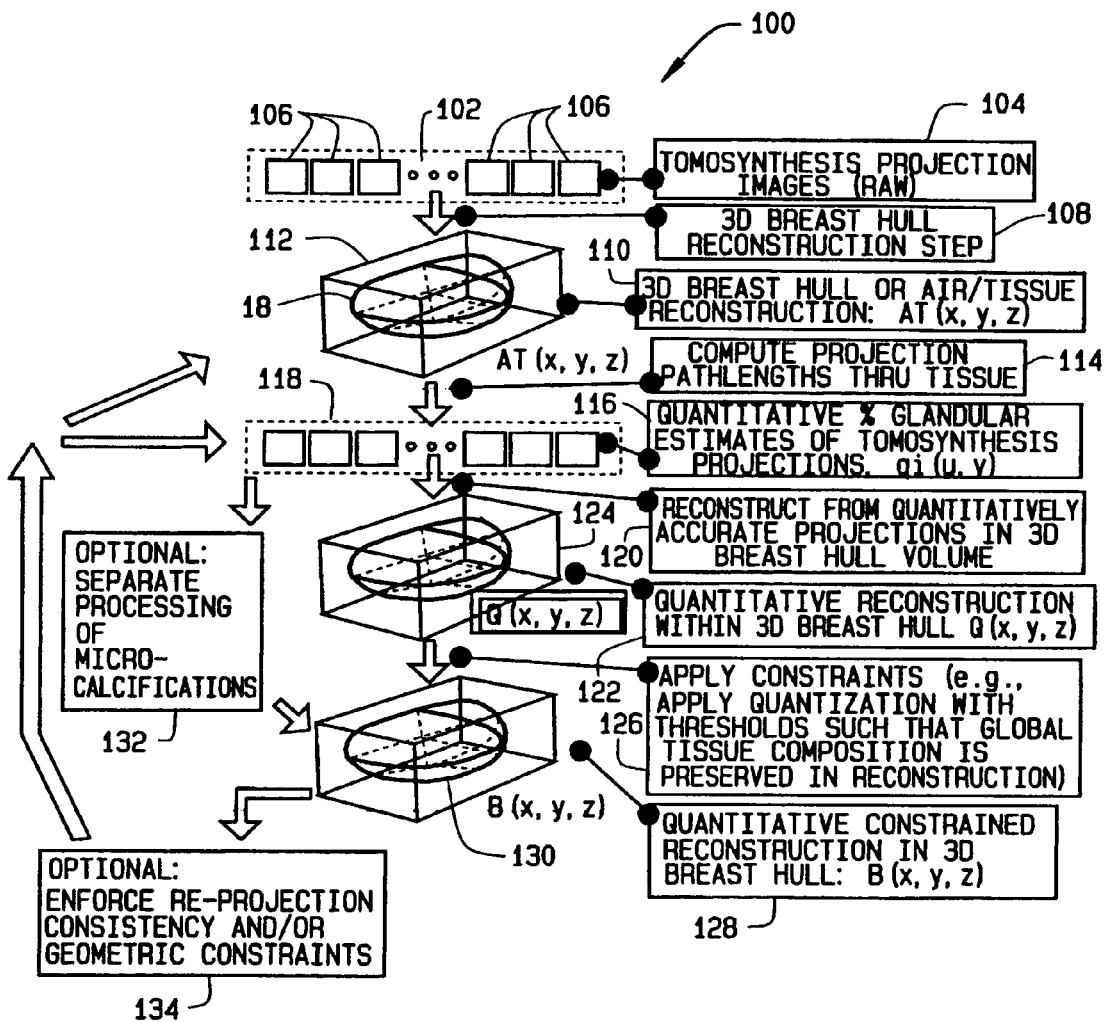
FIG. 3 is a combination flowchart and pictorial diagram of steps and intermediate results in a configuration of the present invention in which a volumetric image containing quantitative composition estimates of three-dimensional breast volumes are reconstructed.

As used herein, the term "quantitative projections" refers to processed versions, qi(u,v), shown as 118 in FIG. 3, of a tomosynthesis projection dataset, pi(u,v), shown as 102 in FIG. 3. The result of the processing is a set of projection radiographs, qi(u,v), where each pixel intensity in each projection radiograph indicates the percentage or amount (line integral, for example) of a material class along the ray corresponding to that pixel.

As used herein, the term "reprojections" refers to the projections obtained by applying a projection operator to an intermediate volumetric image in the reconstruction algorithm, where the projection geometry used in the computation of the reprojections is identical to the projection geometry that was used to acquire the corresponding original projection radiograph pi(u,v). For instance, Q(x,y,z) or B(x,y,z) may be "reprojected" to produce ri(u,v).

The terms "three dimensional (3D) volume" and "volumetric image" refer to a reconstructed 3D image of an object composed of voxels, which, in some of the examples herein, is a breast. Volumetric images used herein include AT(x,y,z), Q(x,y,z), ΔQ(x,y,z), MC(x,y,z), and B(x,y,z). In some development, the variable, v, may indicate the continuous volumetric counterpart to any of the voxelized volumes, AT(x,y,z), Q(x,y,z), ΔQ(x,y,z), MC(x,y,z), and B(x,y,z).

A term "breast hull" or "air-tissue volumetric image" refers to the three dimensional space occupied by an imaged breast (as distinguished from the space occupied by the air around the breast). This concept translates correspondingly to other imaged objects as well. An air-tissue volumetric image is denoted AT(x,y,z) herein.

A term "intermediate volumetric image" or "quantitative volumetric image" refers to any intermediate 3D representation of the imaged object. It may be a reconstructed volumetric image of material classes or a volumetric image of continuous-valued voxel intensities. An intermediate volumetric image is denoted Q(x,y,z). If it is the first such intermediate volumetric image in a reconstruction algorithm used for, e.g., deriving volumetric image statistics, it is called an "initial volumetric image"; an initial volumetric image is denoted Q0(x,y,z). Sometimes a volumetric update to an intermediate volumetric image is computed; these updates are denoted ΔQ(x,y,z).

A term "N-ary volumetric image" refers to any 3D representation of the imaged object in which each voxel assumes a value which is an intensity within a single material class, or a label corresponding to a single material class. An "approximately N-ary volumetric image" is similarly defined, but relaxes the constraint that all voxel values correspond to specific material classes, and allows a small fraction of the voxel values in the volumetric image to assume values that do not correspond to a material class. Both of these types of volumetric images are denoted B(x,y,z).

The term "reconstruction" refers to a process of creating a 3D volume (volumetric image) from a set of projection images. The "reconstruction algorithm" may comprise one or more reconstruction steps, which may each be applied in isolation or in concert with other reconstruction steps. The reconstruction algorithm may also iterate any number of reconstruction steps in any appropriate order.

Digital tomosynthesis is a three-dimensional imaging technique in which typically only a few, e.g., ten to twenty, projection radiographs are acquired at varying radiation source focal spot positions with respect to an imaged object and a radiation detector. In many configurations, the radiation tube is an x-ray tube and the radiation detector is, correspondingly, an x-ray detector. For simplicity, only x-ray imaging configurations are discussed herein, but configurations of the present invention are not limited to the use of a particular type of radiation. One configuration of digital tomosynthesis for mammography is described by Niklason, et al. in U.S. Pat. No. 5,872,828, issued Feb. 16, 1999.

Figure 1:
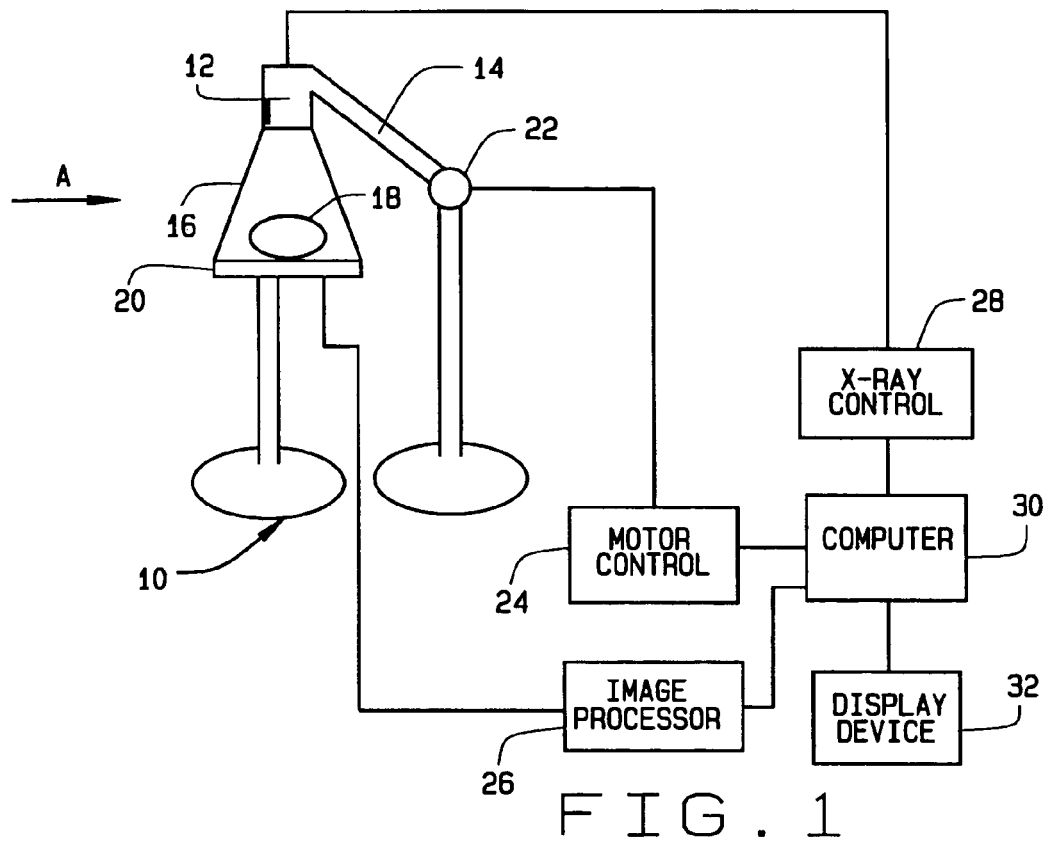
FIG. 1 is a block diagram representative of some configurations of a tomosynthesis system of the present invention.

For example, and referring to FIG. 1, some configurations of digital tomosynthesis systems 10 of the present invention comprise an x-ray tube 12 on a gantry arm 14. X-ray tube 12 projects radiation 16 towards an object 18 disposed between x-ray tube 12 and a detector array 20, which is used to acquire projection radiographs. Gantry arm 14 rotates about a pivot point 22 to enable a plurality of projection radiographs to be obtained using different focal spot positions of x-ray tube 12. Digital tomosynthesis system 10 in some configurations also comprises a motor controller 24 to rotate gantry arm 14 around pivot point 22 and an image acquisition and processing device 26 that receives and processes the acquired projection radiographs. Also provided in some configurations is an x-ray controller 28 to control the operation of x-ray tube 12. The entire apparatus 10 in some configurations is under control of a computer 30 which is responsive to operator input, and a display device 32 and/or a printer may be provided in some configurations to display or print processed images of object 18. Although not shown in FIG. 1, archival mass or removable storage or a network connection to a public or private network may also be provided for acquired data and/or images. In various configurations, software or firmware is provided to configure computer 30 and/or image acquisition and processing device 26 to control motor controller 24, x-ray tube 12, detector array 20, display device 32, and display device 32 to acquire projection images of an object 18 (for example, a breast) and to configure computer 30 and/or image acquisition and processing device 26 to perform procedures described below for reconstructing volumetric images and displaying the reconstructed volumetric images on display device 32 or elsewhere. In some configurations, the reconstructed volumetric images can be stored in a memory (not shown) and displayed at a later time.

Figure 2:
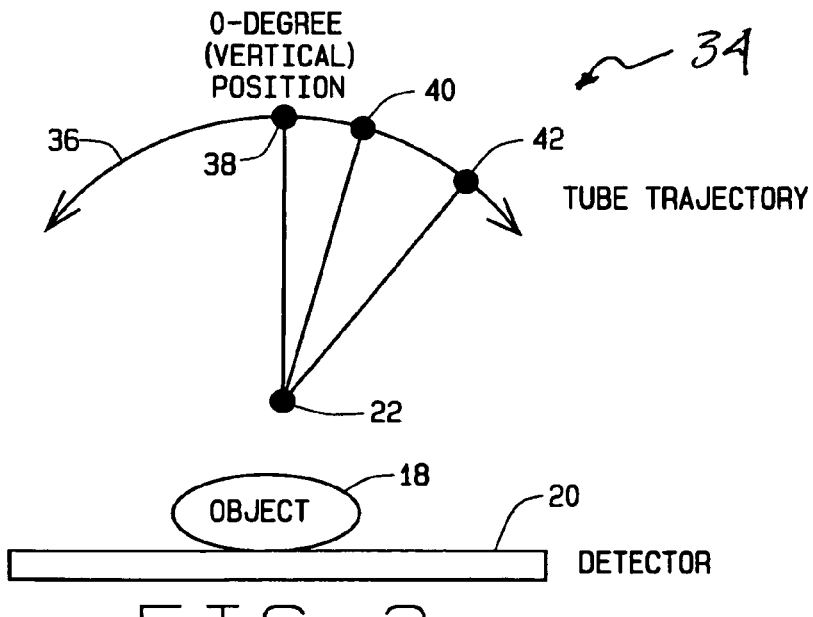
FIG. 2 is an illustration of system geometry of various configurations of tomosynthesis systems represented by FIG. 1.

A nominal geometry 34 of tomosynthesis system 10 of FIG. 1 for breast imaging is illustrated in FIG. 2. As viewed from arrow A in FIG. 1, radiation detector 20 and imaged object 18 (in this configuration, a breast) are assumed to be stationary, while x-ray tube 12 attached to gantry arm 14 rotates around pivot point 22 along a trajectory 36 to acquire projection images from different views. In FIG. 2, three focal spot positions are shown from which projection images are obtained, namely, focal spot position 38, focal spot position 40, and focal spot position 42. More typically, however, ten to twenty projection radiographs are acquired at varying x-ray focal spot positions, not all of which are separately represented in FIG. 2.

In some configurations of tomosynthesis system 10, gantry pivot point 22 is located 22.4 cm above detector 20, and the distance from focal spot 38 (and other focal spots) to pivot point 22 is 44.0 cm, as projected into the plane of FIG. 2. The angular range of gantry arm 14 is from −25° to +25° degrees relative to a vertical position of gantry arm 14, exemplified in FIG. 2 by focal spot position 38. Other tomosynthesis configurations may include, for example, a moving detector, multiple detectors, multiple x-ray sources, and so forth.

In some configurations, typically eleven projection radiographs are acquired, for x-ray tube 12 positions covering the full angular range of gantry arm 14, in 5° increments. This set of eleven projection radiographs is referred to herein as the tomosynthesis projection dataset. Using the tomosynthesis projection dataset, image processor 26 and/or computer 30 can reconstruct a volumetric image representative of the 3D characteristics and structure within the full three-dimensional volume of imaged object 18 using an appropriate reconstruction algorithm. Image processor 26 and computer 30 are not necessarily separate components. Various different reconstruction algorithms are known. These known reconstruction algorithms have different performance characteristics related to image quality (e.g., contrast, artifacts and noise) and to computational requirements (e.g., memory, speed). See, for example, Kak, et al., "Principles of Computerized Tomographic Imaging," IEEE Press, 1988. Configurations of the present invention for quantitative tomosynthesis volumetric image reconstruction are not limited to the tomosynthesis system geometry as described in FIG. 2. In particular, quantitative tomosynthesis reconstruction configurations of the present invention can be used in other, more general situations, where the goal is to reconstruct quantitative three-dimensional information about an imaged object from relatively few projection radiographs. More particularly, in some configurations of the present invention, various reconstruction algorithms known in the art can be used to estimate an initial three-dimensional volumetric image 112 or 124 in FIG. 3, for example, that is then further processed or iteratively updated according to the present invention.

A normal, healthy breast consists almost entirely of two distinct material classes of tissues, namely fatty tissue and glandular-like tissue (i.e., radiographically equivalent to fibroglandular tissue). A very small fraction of the breast may consist of calcium salts in very small quantities, usually termed "microcalcifications." Although configurations of the present invention are described herein that deal with all three types of breast tissues, some configurations focus on fatty and glandular-like tissues. These two tissues have distinct x-ray attenuation spectra, making it possible, in one embodiment, to compute a quantitative projection image by decomposing a breast x-ray projection radiograph into relative amounts of fatty and glandular-like tissue at each image pixel. Such a decomposition is made possible using additional information, which, in some configurations, includes system 10 calibration data, compressed breast thickness, and x-ray technique information. Cancerous lesions have attenuation properties that are very similar to normal glandular tissue, and which can therefore be accommodated with a two-tissue configuration, wherein the lesions appear glandular-like. On the other hand, microcalcifications represent an exception to a two tissue composition assumption in that microcalcifications include highly attenuating material (namely, calcium salts) having very different radiographic properties than either fatty or glandular tissue. However, because microcalcifications are typically very small, covering only a few pixels in a projection image, their effect on quantitative imaging is very limited. Further, specific methods have been developed to detect and compensate for local "outliers" caused by microcalcifications.

In configurations of the present invention, prior knowledge about object 18 (e.g., for a breast as object 18, the underlying anatomy and its x-ray properties, maybe in combination with other, additional information described herein below) is used to arrive at a reconstructed volumetric image that quantitatively reflects the actual composition of object 18 in terms of a specified set of material classes assumed or hypothesized to comprise most of the volume of object 18. The volumetric image that is the output of the reconstruction is referred to as either "essentially N-ary" or "approximately N-ary." By "essentially N-ary" and "approximately N-ary" (and other similarly qualified "N-ary" volumetric images), it is meant that most of the voxel values in the reconstructed volumetric image correspond to exactly one of a set of a selected number N (where N is two or more) material classes assumed or hypothesized to comprise most of the volume of object 18. A smaller portion of the reconstructed volumetric image of the object may or may not be labeled as one or a small number of other hypothesized material classes that comprise a remaining part of the volume of object 18. If all of the composition of the reconstructed volumetric image of the object is represented by voxels exclusively from the set of N material classes, the construction is referred to as "strictly N-ary." An "N-ary volumetric image" with no other qualifications includes within its scope both approximately N-ary volumetric images and strictly N-ary volumetric images. For N=2, the volumetric image is called "binary".

In some configurations and referring to flow chart 100 of FIG. 3, a method useful for reconstructing quantitative three-dimensional volumetric images of objects (e.g., breasts) comprises a plurality of steps, some of which are optional and some of which may be satisfactorily performed using any of a plurality of different methods. It is also not necessary in all configurations of the present invention to perform all of the steps of flow chart 100 in the exact sequence shown in FIG. 3. The technical effect of apparatus 10 (or other apparatus configurations of the present invention) is achieved by a user operating the apparatus to acquire, at 104, a tomosynthesis projection dataset 102 that comprises a set of projection radiographs 106 of an object 18, such as a breast, from different projection angles and reconstructing a volumetric image of the imaged object from the projection images.

The result of a decomposition of a projection radiograph image, for example, a mammogram, into its fatty and glandular-like components, is a new image or set of images for each x-ray projection radiograph. The new image or set of images, for example, capture the percent glandular tissue and the associated height of the tissue. These new images are referred to as quantitative projections. This approach to quantitative projection imaging is described by Kaufhold et al., "A calibration approach to glandular tissue composition estimation in digital mammography," Med. Phys. 29(8), August 2002, pp. 1867-1880. See also published U.S. patent applications Ser. Nos. 2003/0072417, "Method and apparatus for calibrating an image system," and 2003/0072409, "Methods and apparatus for estimating a material composition of an imaged object."

In some configurations, the projection images that are part of the tomosynthesis projection dataset 102 are, or are assumed to be, scatter-free and have had appropriate corrections made for imaging physics and acquisition electronics. Such scatter correction, imaging physics corrections, and corrections for imaging electronics are described elsewhere. For example, see Gonzalez Trotter, et al., "Scatter Correction in Tomosynthesis Imaging for Mammography," 6th International Workshop on Digital Mammography, 2002, and Gonzalez Trotter, et al. "Thickness-dependent scatter correction algorithm for digital mammography," SPIE, as well as U.S. Pat. No. 6,633,626, "Methods and apparatus for correcting scatter," and U.S. Patent Application Publication No. 2003/021507, "Scatter correction method for non-stationary x-ray acquisitions."

Additional information that may be provided as a result of a decomposition and/or other suitable processing of the projection images includes an indicator of the compressed breast region, an indicator for the breast edge, and summary composition statistics. More specifically, the compressed breast region is an image region in which the compressed breast is in contact with both the cover of detector 20 and a compression paddle, i.e., in that region, x-rays pass only through tissue located between the compression paddle and the detector cover. The breast edge is the contour in the projection images defined by a skinline of the breast. The breast edge is the boundary of a region of the projection radiograph in which x-ray beam 16 passes through some amount of tissue. The indicators for compressed breast region, or breast edge, are essentially curves separating two image regions from each other. These indicators can be generated in the form of an image, or any other appropriate form. From a decomposition of a projection radiograph, other additional parameters can be computed. For example, the composition "summary statistics" include useful global information about the breast, such as overall breast tissue composition.

Thus, in at least some configurations, but not necessarily all configurations, "pre-processing so that processed projection images are quantitative" is related to determination steps concerning a line-integral of the attenuation coefficient, or a composition along a ray. In some configurations, analytical expressions rather than calibration curves are used to perform these steps.

In one configuration of the present invention, the generation of quantitative projection images from a tomosynthesis projection dataset follows a similar procedure as for the standard two-dimensional quantitative composition estimation for standard mammograms discussed above, and the images include the same information as in standard projection imaging (e.g., standard mammography). However, in processing tomosynthesis projection datasets, the system geometry change from view to view must be taken into account.

In some configurations, the compressed breast thickness and tomosynthesis projection dataset 102 are input to the quantitative reconstruction at 104. Tomosynthesis projection data is assumed to be scatter-free and appropriately corrected for imaging physics and acquisition electronics effects. In some other configurations, the images are normalized such that, for each pixel, an average attenuation along the path of a corresponding ray of radiation is indicated, with reference to an assumed object 18 of a fixed thickness, corresponding to the compressed breast thickness. An indicator of the projected edge of the imaged breast, and/or an indicator for the compressed breast region may also be provided. A global breast tissue composition metric for at least one of the images in tomosynthesis projection dataset 102 may be provided, as well as other "summary statistics." Furthermore, additional information about the breast shape may be available through another sensor. For example, a camera (not shown in the Figures) can be used to provide information about the shape of the breast in the noncompressed breast region. This information may also be provided as additional input.

From tomosynthesis projection dataset 102, an estimate of the geometry of the three-dimensional volume that contains breast tissue (i.e., some amount of fatty or glandular material) is determined at 108. This estimate is a description of the physical object shape and location in three dimensions, and is referred to as a Breast Hull Volumetric image. This estimate produces an air/tissue volumetric image of the imaged volume at 110, AT(x,y,z), where AT(x,y,z) is "1" where (x,y,z) coordinates are at a point "inside" the breast hull (tissue), and AT(x,y,z) is "0" where (x,y,z) coordinates are at a point "outside" the breast hull (air). AT can have other representations as well. For example, AT can be represented as a surface that separates breast tissue from the surrounding air (and compression paddle and detector cover). Either representation has substantially the same information with respect to the breast hull, AT(x,y,z). That is, a surface model for the breast can be used to derive a volume, AT(x,y,z), and AT(x,y,z) can be used to derive a surface model of the breast hull, i.e. the surface that separates air from the breast. The air/tissue volumetric image 112 can be determined from the projection images, or from additional information (e.g., compression paddle readout, or additional sensor), or a combination thereof.

In some configurations, breast hull, AT(x,y,z), which is a model of the three-dimensional geometry of the surface of the imaged breast, is reconstructed first for steps 108 and 110. This reconstruction may be accomplished, for example, by performing a preliminary three-dimensional reconstruction in conjunction with an N-ary quantization (e.g., {air, tissue} binary quantization). Reconstruction methods that incorporate information about the detected breast edge (skinline) in at least one of the images in tomosynthesis projection dataset 102 may be used for this purpose. Likewise, smoothness constraints for the 3D skinline may be incorporated into the N-ary volumetric image. If available, additional information about the breast shape which may be available from some other sensor (a camera, e.g.) may also be used to constrain the N-ary volumetric image of the breast hull. The breast hull, or air/tissue volumetric image, AT(x,y,z), is therefore a three-dimensional mask for the breast that describes the interior and the exterior of the breast.

The air/tissue reconstruction (or substitute methodology) is not required in all configurations of the present invention. In some configurations, the reconstruction of the breast hull at 108 and the interior structures of the breast at 122 are performed simultaneously in a single processing step.

From air/tissue volumetric image 112, the x-ray pathlengths through tissue (i.e., the pathlengths through the volume defined by AT(x,y,z)) for each projection radiograph in the tomosynthesis projection dataset are determined at 114. From these pathlengths and tomosynthesis projection dataset 106, an estimate of the percentage of glandular breast tissue composition is determined at 116 for each projection radiograph. To convert tomosynthesis projection dataset 102 into a quantitative percentage glandular projection dataset 118, previously-acquired, or otherwise predetermined, calibration curves are used to estimate the relative amounts of individual tissue composing each pixel in each projection radiograph. The resulting images are referred to as quantitative glandular projection estimates 118, or qi(u,v). That is, the quantitative percentage glandular projection estimates are no longer simply intensities, but rather measured amounts of tissue along the ray corresponding to an x-ray incident on a pixel. Furthermore, from these quantitative percentage glandular projection estimates, a summary statistic for the overall percentage glandular tissue may be determined for a plurality of x-ray projection radiographs.

In yet another configuration, a preprocessing step is applied to tomosynthesis projection dataset 102 that compensates for the effect of reduced tissue thickness near the skinline. This preprocessing step, referred to as "thickness compensation" for two-dimensional projection images, proceeds as though fatty tissue were added in the regions of reduced thickness so as to achieve the full compressed thickness. This step circumvents the three-dimensional breast hull reconstruction, and a quantitative reconstruction based on these preprocessed images will generally generate reliable tissue characteristic estimates at any location within the volume of the imaged breast (i.e., the breast hull). In other configurations, and in addition to thickness compensation, in a region in which x-rays do not pass through any breast tissue, the projection images are modified as though the x-rays pass through the full compressed thickness of fatty tissue.

In some configurations, quantitative projections 118 are obtained by first computing a projection ray pathlength through the breast tissue (i.e., the volume defined by the breast hull AT(x,y,z)) for each pixel in each projection image, and then determining the quantitative projection using appropriate calibration curves for the corresponding tissue thickness. Also in some configurations, the breast hull AT(x,y,z) determination at 108 and 110 is not determined first, but rather assumptions about the shape of the breast in the noncompressed region (e.g., a model of the thickness as a function of the distance from the skinline and the compressed thickness) are used to generate the quantitative projections directly. In these configurations, the determination of the breast hull is not required for the generation of the quantitative projections 118. In other configurations, projection images 104 are normalized such that, for each pixel, the average attenuation is indicated. This average attenuation is referenced to a pathlength through a volume of constant thickness. The average attenuations are used directly as input for reconstruction at 120.

Using the set of quantitative projections 118, one step of a reconstruction algorithm may be used at 120 to estimate intensities in the breast hull, i.e., inside the three-dimensional volume defined by AT(x,y,z). More particularly, the reconstructed intermediate volumetric image, Q(x,y,z), takes on nonzero values only where AT(x,y,z) is "1" at 122. This volumetric image, Q(x,y,z), referred to herein as a quantitative volumetric image of the breast in the breast hull, corresponds to intensity values (typically estimated attenuation values) inside the breast hull estimate, AT(x,y,z) 124. Similarly, with reconstruction algorithms of the prior art, the quantitative volumetric image of the breast in the breast hull 124 takes on numerical intensity values between intensities which correspond to all glandular or all fatty tissue for a given voxel, suggesting that at certain locations within the breast hull, the structure is mixed. However, the anatomy is distinct. That is, ignoring partial volume effects, at any given (x,y,z) coordinate, the intensities in an N-ary volumetric image of the imaged breast 130, for example, are either fatty or glandular. In various configurations of the present invention, the quantitative volumetric image is configured to reflect that fact. Thus, in some configurations of the present invention, an N-ary voxel constraint is applied at 126 to the quantitative volumetric image, Q(x,y,z) so that the volumetric image at any voxel is, for example, either fatty or glandular tissue. For example, the volumetric image is an N-ary volumetric image that labels glandular tissue "2" and fatty tissue "1" at every voxel in the volumetric image, rather than labeling voxels as a mixture of material classes corresponding to mixtures of tissue. To arrive at an N-ary volumetric image from a quantitative volumetric image, in some configurations of the present invention, a plurality of constraints are applied to the reconstructed volume at 126. The constraint set, for example, can include a plurality of models that constrain the anatomical morphology, intensities, and/or summary statistics of the quantitative volumetric image determined at 122. The individual constraints and the constraint set is discussed in more detail herein below. At step 128, the constraint set is used to map the continuous voxel intensities in the volumetric image to intensities of a constrained (e.g., essentially N-ary) quantitative reconstructed volume 130. A separate processing step 132 may be used to separately generate a three-dimensional volumetric image of microcalcifications contained in the breast. This additional information in some configurations is injected into N-ary reconstructed volume 130 of the breast. In some configurations of the present invention, N-ary quantitative reconstructed volume 130 is checked at 134 for consistency against the data (e.g., the quantitative percentage glandular projection estimates), itself, which represents another constraint. This consistency check can be used to update AT(x,y,z), the breast hull estimate 124, or to iteratively update the reconstructed quantitative volumetric image in the breast hull, Q(x,y,z), as indicated by the arrows in FIG. 3.

Figure 7:
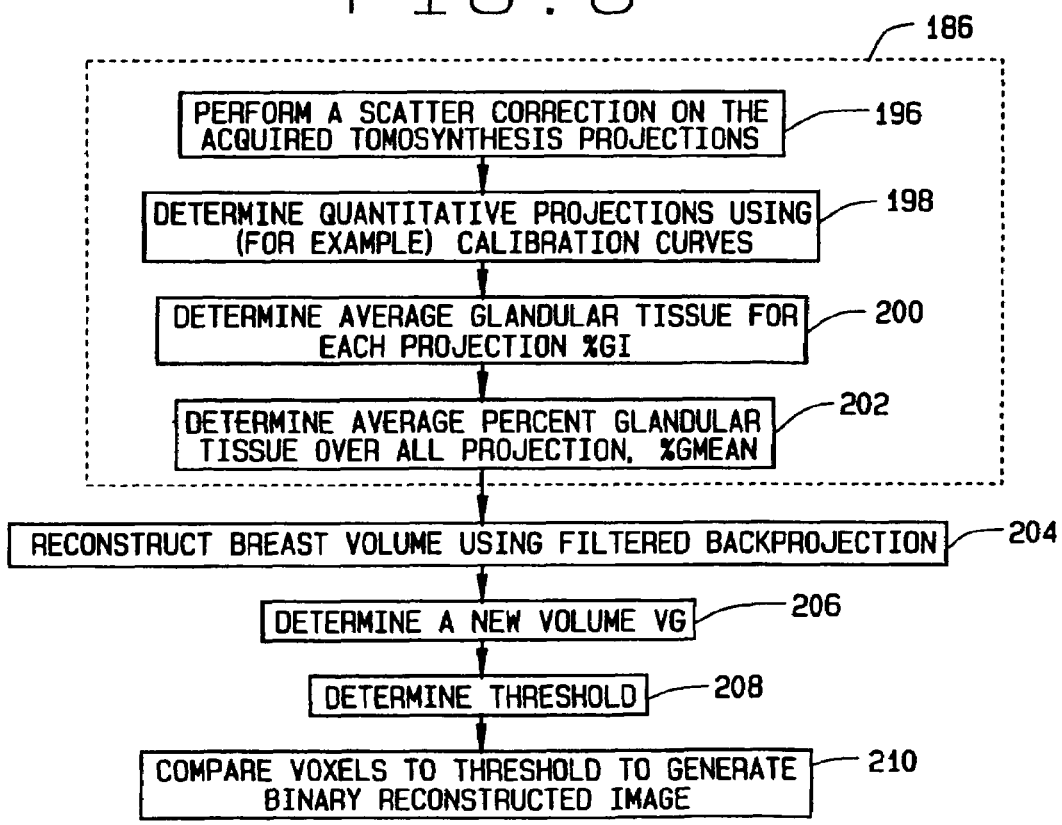
FIG. 7 is a flow chart representing configurations of the present invention in which a scatter correction is performed on acquired tomosynthesis projections.
Figure 8:
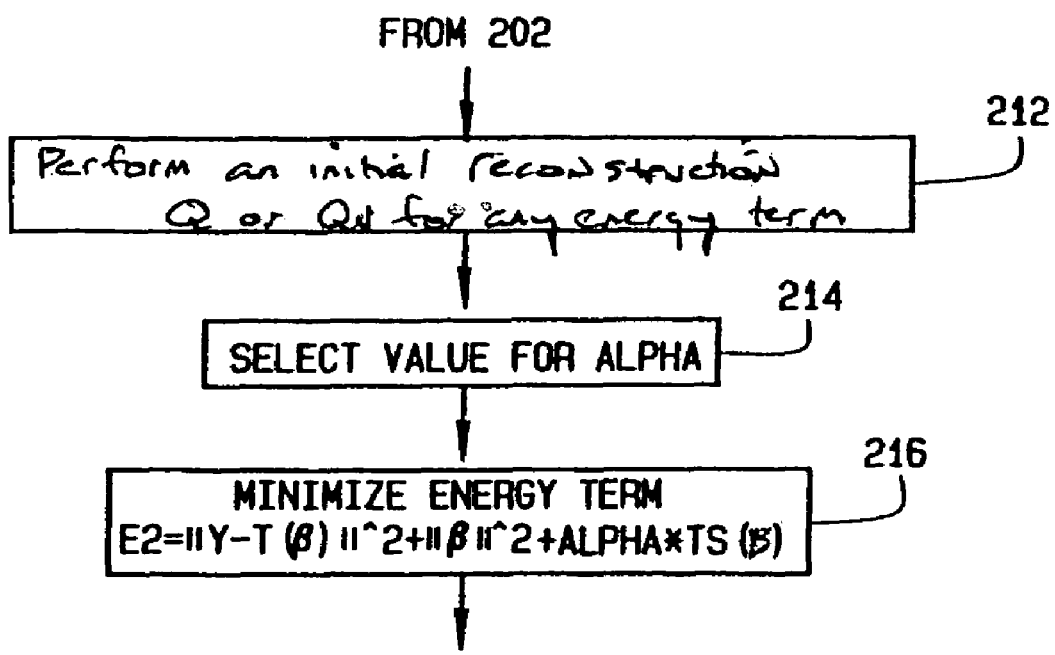
FIG. 8 is a flow chart representing a method of defining an energy minimization term, such as E2, and parameters of the energy minimization term that can be set using statistics gathered from an initial volumetric image.

Referring to the details of step 186 provided in the flow chart of FIG. 7, in some configurations, a scatter correction is performed at 196 on the acquired tomosynthesis projections. Quantitative projections (i.e., percentage glandular vs. percentage fat) are determined at 198 using calibration curves. Composition summary statistics may be computed. Specifically, an average percent glandular tissue for each projection, % Gi, is determined at 200, and an average percent glandular tissue over all projections, % Gmean, is determined at 202 in accordance with an expression which can be written as % Gmean =(% G1+% G2+% G3+. . . +% Gn)/n. In other configurations, % Gi is determined for only a subset of the projection images, or only for a region of interest (ROI) within the projections. Neglecting boundary effects, an overall composition % Gi is constant across different projection images. Thus, the value from a single projection image can be used in some configurations. In yet another configuration, quantitative projections are obtained by using an analytic approach, which may be used in combination with a pre-processing step for scatter correction.

Figure 5:
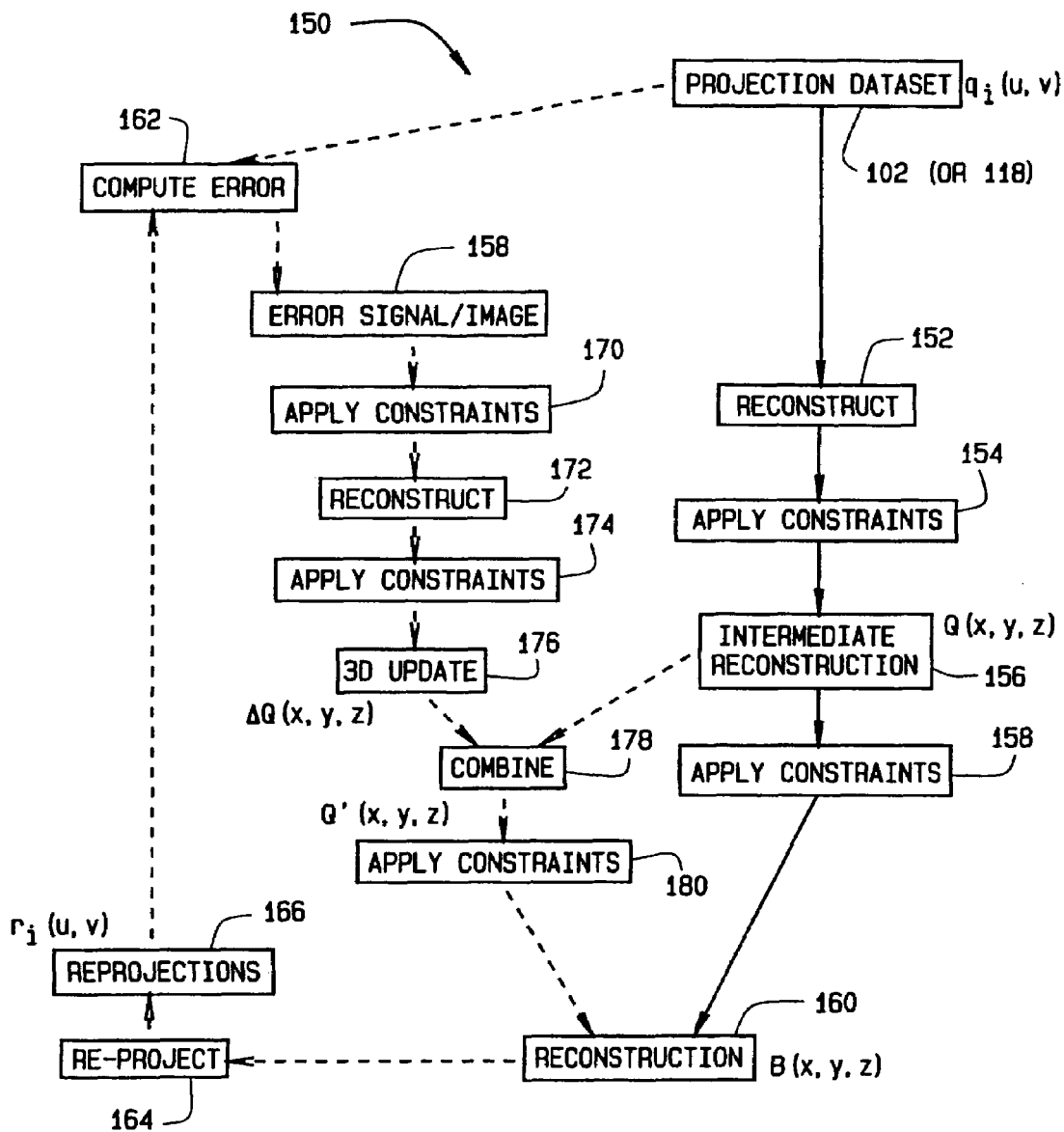
FIG. 5 is a flowchart illustrating a configuration of the present invention in which an algebraic reconstruction technique (ART) is used for iterative updates.

In some configurations, and referring to FIG. 7, an initial estimate of the quantitative volumetric image of the breast, Q, is reconstructed at 204, for example, via filtered backprojection or some other reconstruction algorithm of the prior art. Using a suitable method, for example, thresholding or a method using a three-dimensional morphology, determine an updated air-tissue volumetric image, AT, from Q at 206. This determination is performed in some configurations by thresholding the volumetric image to separate voxels corresponding to tissue from voxels corresponding to air. From the distribution (e.g., histogram) of voxel intensities in Q that are also located within the breast hull (i.e., where AT indicates that the voxel corresponds to tissue), a threshold TG is determined at 208 such that the number of voxels in Q (restricted to the space where AT indicates tissue) above the threshold divided by the total number of voxels in AT is % Gmean/100. In some configurations, the threshold TG is determined as a function of the composition in a single projection, and the corresponding subvolume of the breast hull AT that is projected onto the detector for that projection is used as the reference volume for the determination of that threshold. Then, voxel values in Q, for voxels that are located within the breast hull AT, similarly, are compared to threshold TG at 210. Those above the threshold are assigned to 1, while those below it are assigned to zero. The resulting volumetric image is improved iteratively in some configurations, e.g., by using an ART-like approach as shown in FIG. 5. These values 0 and 1 are examples of labels that can be used for the different material classes corresponding to fatty tissues and glandular-equivalent tissue, respectively. Other labels or values may also be used.

Thus, some configurations of the present invention comprise a method that uses a mammographic tomosynthesis projection dataset 106 together with additional information (e.g., calibration curves, compressed breast thickness, and x-ray technique) to determine a three-dimensional volumetric image of the imaged volume. The reconstructed volumetric image of the imaged volume is represented as a set of voxels with distinct values or labels (e.g., air/background, fatty tissue, glandular tissue, or calcification) that satisfy or arbitrate among a set of constraints, for example, re-projection consistency with the tomosynthesis projection dataset. More specifically, when determining a projection image from the three-dimensional N-ary reconstructed volume dataset (maybe after an appropriate mapping from labels to quantitative values), for one of the projection geometries as used for the data acquisition, the resulting re-projection image is constrained to be essentially identical to the corresponding projection image in the original tomosynthesis projection dataset.

In some configurations, it is not necessary to input quantitative tomosynthesis projection data to the reconstruction algorithm. Instead, in some configurations, it is sufficient to have a good estimate of the corresponding relative linear attenuation coefficients of the different tissue types as information used to develop the constraint set.

In some configurations, a known reconstruction algorithm for tomosynthesis is applied to the quantitative tomosynthesis projection dataset at 120 and/or 122 as one step of our reconstruction algorithm. This step of the reconstruction algorithm is any suitable known reconstruction algorithm that accepts a tomosynthesis projection dataset as input and uses the dataset to reconstruct an estimate of the volumetric image of the object that produced the projection images. In some configurations of the present invention, the projections are two-dimensional projections and the volumetric image reconstructions are three-dimensional reconstructions of an imaged breast. In some configurations of the present invention, one step of the reconstruction algorithm does not produce a volumetric image that corresponds to $Q(x,y,z)$ or $B(x,y,z)$, per se, but rather, incremental changes to these volumetric images, updates $\Delta Q(x,y,z)$ or $\Delta B(x,y,z)$.

Some reconstruction methods, for example, filtered backprojection, require a preprocessing step (e.g., filtering) before the three-dimensional dataset (volumetric image) is formed. Through this preprocessing step some constraints of the quantitative projection images (or quantitative percentage glandular estimate 118) may be violated, and it may be useful in some configurations of the present invention to correct for this type of inconsistency before performing the final reconstruction step. For example, in a filtered backprojection reconstruction method, each projection image is first high-pass filtered and then backprojected. The filtering step can potentially introduce very high or very small values (greater than 100% glandular or smaller than 100% fat). Some configurations of the present invention therefore round or threshold these outliers to the nearest admissible value to improve the volumetric image. In some configurations, the reconstructed volumetric image is constrained to the interior of the breast hull.

The volumetric images produced by the reconstruction algorithm may be constrained more generally to produce a "constrained volumetric image". Common to all constrained volumetric images in the present invention is at least one constraint that enforces an N-ary or approximately N-ary material class decomposition in $B(x,y,z)$. The constraints used to produce a constrained volumetric image may also include 1) constraints on the shapes of structures of specific material classes within the volumetric image, $B(x,y,z)$; 2) constraints on the number of voxels corresponding to a specific material class in the volumetric image; and 3) constraints on the connectedness of materials within the volumetric image, $B(x,y,z)$. An example of connectedness is, for example, the six or twenty-six connectedness of the sets of voxels of the same material class in the volumetric image, $B(x,y,z)$.

In some configurations, the reconstruction step simultaneously reconstructs interior structures of the breast as well as the breast hull (i.e., its three-dimensional shape and location). In these configurations, additional information, such as the breast edge (projected skinline) as detected in tomosynthesis projection dataset 106, can be used in the reconstruction. In some configurations, this additional information is used in conjunction with smoothness constraints and other constraints. This simultaneous reconstruction of the geometry and the three-dimensional interior breast structure lends itself to an iterative update, as described below, in which at each step, the skinline geometry as well as the reconstruction of the breast is improved.

Some configurations of the present invention do not use a reconstruction constraint to map the quantitative volumetric image to an approximately N-ary volumetric image, i.e., the output volumetric image $B(x,y,z)$ is the same as the input volumetric image $Q(x,y,z)$.

In some configurations, an initial volumetric image 124 of the object is iteratively improved, by applying subsequent processing steps to the initial volumetric image 124. At any iteration, either no constraints at all or a plurality of constraints such as those described below are applied in some configurations. Some constraints can be more useful than others at specific points in the quantitative reconstruction. However, in configurations in which constraints are applied, the constraint or constraints comprise at least one constraint selected from those that follow, and may depend on the application sought to be accomplished and/or a specific step or iteration in the configuration.

One useful reconstruction constraint is a constraint in the volumetric extent of the volume defined by the air/tissue volumetric image. This constraint may be an integral part of the reconstruction step, or it may be used as a separate constraint. This constraint may be incorporated jointly with another reconstruction step, such as joint estimation of $Q(x,y,z)$ and $AT(x,y,z)$, or it may be performed as a "masking" operation, where, for instance, the reconstruction step constrains $B(x,y,z)$ or $Q(x,y,z)$ to be "0" except where $AT(x,y,z)$ is "1".

Another useful constraint is to quantize in such a way that a "constrained volumetric image" is produced, e.g., such that the composition (i.e., material class membership of voxel values) of the volumetric image $B(x,y,z)$ matches the total percent glandular summary statistic obtained from the quantitative projections. Both the volumetric extent as well as the material class membership constraint are specific constraints that can be used separately or together to improve the reconstructed volume. In general, a number of constraints can be combined into a constraint set. Even the projection images that are used as input for the reconstruction step can be viewed as constraints. The specific form of the "constraint set" which produces a "constrained reconstruction" may be any information or processing which injects additional information in the process of reconstruction from projections.

Some configurations of the present invention enforce constraints by modifying a first (intermediate) volumetric image (initial volumetric image or intermediate volumetric image, for example) that was previously computed without being subject to the set of constraints. However, in some configurations, these constraints are built directly into the reconstruction step. In other configurations, a number of subsequent steps in the reconstruction algorithm may impose constraints on the reconstructed volume, wherein each step may impose one or a combination of two or more constraints in the reconstructed volume, and different steps may include different sets of constraints. Also, each step may only improve the degree to which a set of constraints is satisfied, and not strictly impose that constraint. In some cases, a formal definition of a reconstruction energy can be used to arbitrate among conflicting constraints.

Elements of such constraint sets include, but are not limited to:

1. Quantization of the voxel intensities in the 3D volumetric image, wherein a threshold is chosen. Methods to choose a threshold include, but are not limited to (a), (b) and (c) below:

(a) Determining a threshold using first principles of imaging physics (for example, attenuation coefficients). For example, a threshold is chosen halfway between the target quantization values. In some configurations, for an intensity value, x, between the expected intensities for each of the "fat" and "glandular" tissues, a voxel is set to "fat" if x is less than ½("fat"+"glandular"), and to "glandular" otherwise.

(b) Determining a summary statistic from at least one projection image, and using these summary statistics, choosing a threshold that matches the same summary statistic of the 3D volumetric image. The summary statistic can be any metric, which for example may include, but are not be limited to, the total percent glandular summary statistic and the gray level integral in the attenuation value domain. For example, if the global composition of the imaged breast was determined to be 40% glandular, then the threshold for quantization is chosen such that 40% of the candidate "fat" or "glandular" voxels are quantized to glandular. The proper threshold can be determined, for example, from the histogram of voxel values in the (non-quantized) volumetric image Q(x,y,z). Using more than one constraint of a similar nature allows accurate adjustment of several quantization thresholds (e.g., threshold air/fatty tissue, and threshold fatty tissue/glandular tissue).

(c) Re-projecting the previously reconstructed 3D volumetric image Q(x,y,z) at all acquisition angles and choosing one threshold that best matches summary statistics between original tomosynthesis projection dataset 102 and re-projections of the reconstructed 3D volume.

2. Morphological constraints, such as size and shape of connected regions of glandular voxels, that may require the 3D structures in the N-ary volumetric image to resemble more closely the anatomical properties of a real breast. These constraints may include, but are not limited to, (a) and (b):

(a) Relabeling (for an intermediate quantized B(x,y,z)) or adjusting voxel intensities (for a non-quantized Q(x,y,z)) where isolated pixels or small groups of pixels differ from their background volumes in some neighborhood. For example, a single isolated voxel of glandular tissue is not expected within a larger volume that is all fatty tissue. Other anatomical prior knowledge can be used to allow or disallow certain structures within the reconstructed volumetric image.

(b) Some reconstruction threshold choices or relabeling choices may make certain structures too large or too small. These structures can be altered in intensity, size and/or shape characteristics by standard volume processing techniques, e.g., using mathematical morphology.

Constrained volumetric image 130, B(x,y,z), can take on a number of different forms depending on the particular constraint set applied to the quantitative volumetric image at 128 that produced it.

1. In one configuration, each voxel is assigned a label based on material classes chosen in the constraint set. For example, for air, fat, and glandular labels, the form of the volumetric image can be an indexed set of three labels. In configurations in which the volume containing any tissue is constrained to the breast hull, AT(x,y,z), the form of B(x,y,z) can be an indexed set of only two values, fat and glandular. If microcalcifications are included in B(x,y,z), there can be two, three, or four labels. For example, in one labeling scheme, if B(x,y,z) is already constrained to exist in only the breast hull, the form of B(x,y,z) may comprise labels for only soft tissue (fat or glandular) and microcalcifications. In other configurations, specific soft tissue distinctions are also designated within the breast hull using labels that designate fat, glandular, and microcalcification. Some configurations use only labels, exclusively. For example, air, fat, glandular and microcalcification labels are used in a single B(x,y,z) in some configurations. In some configurations, as an alternative to labels, specific distinct numerical values can be used to indicate constituent components of the imaged volume (e.g., one can use linear attenuation coefficients associated with the different tissue types for some fixed x-ray or radiation spectrum as indicators).

2. In some configurations, a constrained volumetric image 130, B(x,y,z), is a numerical mapping from Q(x,y,z) which produces a "fuzzy" numerical label associated with each tissue type. Such a "fuzzy" labeling allows intermediate tissue labeling in the volumetric image, which can capture partial volume effects, for example. In such a mapping, instead of forcing each voxel to take on one of a set of specific labels (or numerical values) associated with particular material classes, this constraint is relaxed and B(x,y,z) takes on voxel intensity values that are allowed to move "closer" to the numerical labels based on image properties. In this way, the voxel intensities in Q(x,y,z) are remapped to a scale related to the labels as described in (1) immediately above, but are actually another set of intensities. Thus, the voxel-values in B(x,y,z) do not correspond to a set of discrete labels, but rather a continuous-valued set of intensity values. For example, in some embodiments, the sets of intervals $\{[air, air+\Delta_a], [fat-\Delta_f, fat+\Delta_f], [glandular-\Delta_g, glandular+\Delta_g], [calc-\Delta_c, calc+\Delta_c]\}$, define the allowable material classes in B(x,y,z). A value in Q(x,y,z) that lies between "fat+$\Delta_f$" and "glandular-$\Delta_g$" is rounded to a value either between "fat" and "fat+$\Delta_f$" or between "glandular" and "glandular-$\Delta_g$", depending on the material class constraints. A different value in Q(x,y,z) that lies between "fat-$\Delta_f$" and "fat+$\Delta_f$" might remain unchanged, depending on the material class constraints. Thus, mappings need not specifically map a numerical intensity value in Q to a label in B, but can be more broadly defined as the result of applying the material class constraints to Q.

Because microcalcifications represent exceptions to the two material class tissue composition model, where the two material classes are fat and glandular tissue, e.g., in some configurations, they are processed separately, using known image processing techniques to detect microcalcifications in the projection image dataset with a high degree of reliability. Once microcalcifications are detected, they can be excluded from the reconstruction procedure and the subsequent quantization step and reconstructed separately. Three-dimensional calcification information can then be inserted into the constrained reconstruction to recover a full quantitative volumetric image of the imaged breast. In some configurations and referring to FIG. 4, the separate processing of calcifications at 132 includes the following steps:

At 136, find and detect microcalcifications in each image of tomosynthesis projection dataset 102 (or quantitative percentage glandular estimate 118).

At 138, perform a 3D reconstruction from the microcalcification detection images, and save this volumetric image as MC(x,y,z). MC has essentially a zero mean background and signal only at the locations of the microcalcifications.

At 140, find individual microcalcifications in the 3D volumetric image (i.e., in MC(x,y,z)).

At 142, determine locations at which the microcalcifications in the volumetric image, MC(x,y,z), manifested themselves in projections (e.g., by re-projecting the 3D volumetric image MC(x,y,z)).

At 144, determine a microcalcification-free quantitative volumetric image Q(x,y,z), e.g., by using one of the following methods (a) (b) or (c).

(a) In determining a quantitative volumetric image 124 of the breast, Q(x,y,z), at (x,y,z) coordinates that correspond to the location of microcalcifications in at least one of the projection images, use only that subset of the quantitative projection radiographs, $q_i(u,v)$, that contain no microcalcifications that would project to that particular (x,y,z) coordinate. Thus, in one step of the reconstruction algorithm, the projection radiographs that contain the microcalcifications at (u,v) locations that map to the (x,y,z) location being reconstructed are disregarded.

(b) Values in quantitative projection radiographs, $q_i(u,v)$, at (u,v) locations that coincide with the projected location of a calcification are replaced by an appropriate "calcification-free" estimate based on neighboring pixel values, and the resulting adjusted $q_i(u,v)$ images are used as input for the quantitative reconstruction.

(c) The size and x-ray attenuation characteristics of the reconstructed 3D calcifications (found in MC(x,y,z)) are used to correct the corresponding pixel values in the quantitative projection radiographs, $q_i(u,v)$, by "removing" the estimated contribution of the calcifications to the observed images, based on imaging physics. Again, the resulting images are used as input for the quantitative reconstruction. The result of this step is a microcalcification-free quantitative 3D volume Q(x,y,z).

At 146, use the "corrected" microcalcification-free quantitative volumetric image Q(x,y,z) to form the corresponding "constrained volumetric image", B(x,y,z).

At 148, to the constrained quantitative volumetric tissue image, B(x,y,z), combine MC(x,y,z) in an appropriate way.

In some configurations, the resulting volumetric image, B(x,y,z) (or Q(x,y,z)) is iteratively updated at 124 to enforce consistency with the input data, and/or other additional information and constraints. For example, the reconstructed volumetric image is re-projected, the re-projected images are compared with the original projection images, and the volumetric image is updated so that the deviation between original tomosynthesis projection dataset and the re-projected dataset becomes smaller. This step can be repeated to achieve convergence to a solution that satisfies the re-projection consistency constraint. Furthermore, this iteration may include one or more separate steps to update the breast hull, the quantitative volumetric image within the breast hull, Q(x,y,z), and the constrained quantitative volumetric image, B(x,y,z), each separately or together. Some configurations perform a plurality of these improvement steps at each iteration step. In some configurations, the images used as input to the reconstruction process are updated at each step such that the reconstructed volumetric image based on the updated images is an "improved" volumetric image.

Enforcing consistency between a reconstructed volumetric image (either Q or B) and the acquired projection images may require a "re-projection" step in which a reconstructed volumetric image is used to produce one or more projection images. The reconstructed volumetric image is re-projected in some configurations so that the re-projections are directly comparable to the acquired projection images. The re-projection can be generalized into one that transforms a labeled volumetric image into one or more re-projections having pixel intensities that are continuous-valued so that they are comparable to the qi(u,v) projection radiograph dataset.

Determining an error signal for the consistency constraint may be as simple as subtracting images in the tomosynthesis projection dataset from a set of re-projections on a pixelwise basis. However, other methods for determining an error signal for a set of acquired projections and re-projections can be used. The acquired projections are $q_i(u,v)$. The re-projections at iteration j are $r_i(u,v)^{(j)}$ or $b_i(u,v)^{(j)}$. The error signal may be some function of the tomosynthesis projection dataset (or some processed version thereof), as well as all the re-projections at every prior and current iteration. That is, the error signal may be:

$$E_j = \Psi(\Xi_0(q(u,v)), \Xi_1(r_1(u,v)), \Xi_2(r_2(u,v)), \ldots, \Xi_j(r_j(u,v)), \Xi_{j+1}(b_1(u,v)), \Xi_{j+2}(b_2(u,v)), \ldots, \Xi_{2j}(b_j(u,v)))$$

For example, the $\Xi_i$ functions can be used to compute the error at specific regions of the projections or weight the errors at specified regions in the projection domain. This is useful because some regions of the re-projections or the quantitative projection radiographs themselves may contain differences that are irrelevant to the output volumetric image, B(x,y,z), 130 in FIG. 3, for example. The error function, $\Psi$, takes as inputs two sets of images in the projection domain and can be a difference of the image sets or a difference with a saturating non-linearity or some other nonlinear operation on the image sets. In general, $\Psi$ and $\Xi_i$ are functions that can depend on local neighborhoods of pixel intensities and/or global properties of the volumetric image, the acquired projections, or the re-projections.

In some configurations, determining a volumetric update to a volumetric image comprises reconstructing a volumetric image that corresponds to the difference between re-projected images and the original tomosynthesis projection dataset 102, and adding this "volumetric update image" to the previously determined volumetric image, B(x,y,z) or Q(x,y,z), using an appropriate weighting. However, other combinations of reconstructed volumetric images and volumetric update images to volumetric images can be used. For example, some configurations combine the reconstructed volumetric image from the previous iteration and the "volumetric update image" using a nonlinear transformation. Such a nonlinear transformation can include multiplicative transformations, logarithmic transformations, saturating nonlinearities, or other transformations or nonlinear look up tables. Such a nonlinear transformation can be applied to either the previous iteration's volumetric image, the volumetric update image, both, or the combination, itself, can be remapped nonlinearly. The combination can include spatial filtration, wherein volumetric image voxel intensities are adjusted in accordance with local neighborhood and/or global reconstructed volumetric image properties.

In some configurations, and referring to FIG. 5, a variant of an algebraic reconstruction technique (ART) 150 is used for iterative updates. A technical effect of apparatus 10 (or of other configurations of the present invention) is achieved by a user operating apparatus 10 to perform an initial reconstruction as indicated at 152, 154, 156, 158, and 160, from tomosynthesis data set 102 (or quantitative percentage glandular estimate 118). The result is constrained at 154 and 158 in some, but not all configurations. The volumetric image is re-projected at 164 and 166. An error is determined at 162 and 158 between re-projection 166 and original dataset 102 or 118. This error may be determined for one or more of the projection images. Some configurations apply an appropriate constraint set at 170 specific to this step or iteration. A volumetric update image 176 is reconstructed at 172 using the error signals. Volumetric correction image 176 is constrained at 174 with some constraint set specific to this step or iteration in some configurations. At 178, the volumetric correction image 176 is combined with the volumetric image 156 or 160 from a previous iteration. The existing volumetric image may be either a quantitative volumetric image, Q(x,y,z), 156 or the constrained volumetric image, B(x,y,z) 160. This combination is constrained at 180 in some configurations using a constraint set specific to this step or iteration. The iteration is stopped or, if necessary, another iteration is performed by continuing at step 164. The constraints that are utilized in this approach, can be appropriately chosen from the plurality of constraints explained above.

In some configurations of the present invention, appropriate energy functionals (or energy functions or energy terms) will assume a minimum for the volumetric images, B(x,y,z), that simultaneously satisfy, and/or arbitrate among, a number of simultaneous constraints. Typically each constraint in the considered constraint set corresponds to a specific term in the energy functional. This energy minimization interpretation leads to strategies and algorithms for tomosynthetic volumetric image reconstruction that are fundamentally different from the reconstruction algorithm as described up to this point in the present invention. In an implementation-specific approach (as it is described up to this point), where reconstruction steps are designed to satisfy individual constraints one (or few) at a time, it is difficult to devise reconstruction algorithms consisting of steps that simultaneously satisfy or arbitrate among the many constraints desirable in the output volumetric image. Often one reconstruction step undoes or corrupts the desirable property from a previous step of the reconstruction algorithm. In configurations of the present invention in which an energy functional is used to reconstruct a volumetric image, the reconstruction algorithm comprises a number of reconstruction steps (for example, iterations), where generally each step decreases the value of the energy functional by modifying the current estimate of the reconstructed volumetric image. In some configurations of the present invention, optimization methods (coordinate descent, gradient descent, Newton's method, coordinatewise minimization, etc.) are used to find a volumetric image that best either simultaneously satisfies or arbitrates among the multiple constraints corresponding to terms of the energy functional. In other configurations, other strategies may be used, where the value of the energy functional does not necessarily decrease in each update step. This may be useful in situations where the energy functional has local minima.

Figure 6:
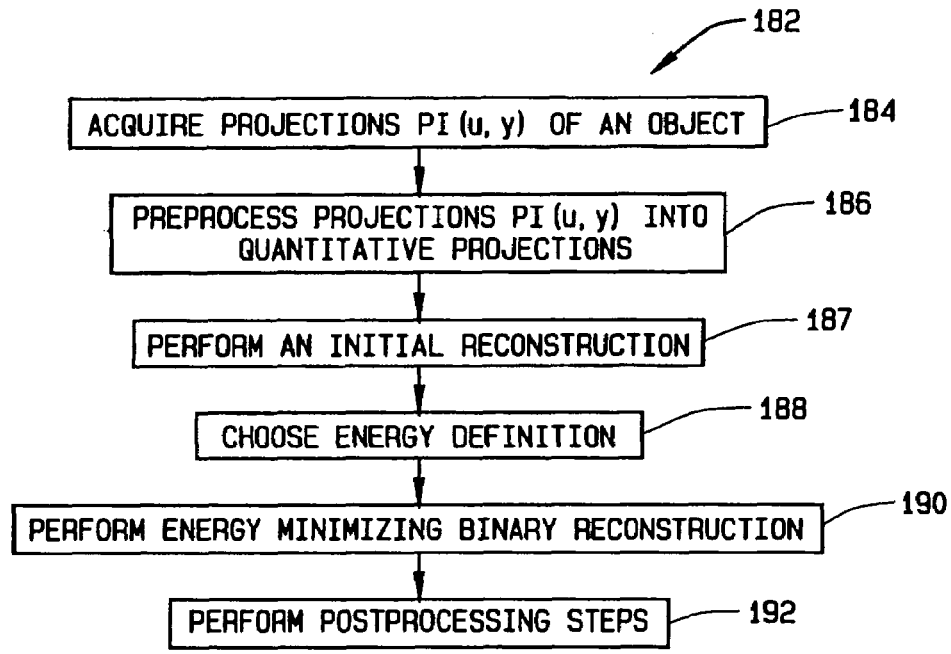
FIG. 6 is a flowchart illustrating yet another configuration of a volumetric image reconstruction method of the present invention.

In some configurations of the present invention, and referring to flowchart 182 of FIG. 6, a technical effect of apparatus 10 (or another configuration of the present invention) is achieved by a user operating the apparatus to reconstruct a volumetric image of an object, initially by acquiring projections pi(u,v) of an object at 184. In some configurations, projections pi(u,v) are preprocessed at 186 so that they are quantitative projections. The preprocessing may contain such steps as bad pixel correction, gain correction, scatter correction, and a correction to remap intensities to reflect a quantitative measure of composition, for example by making the intensities true line integrals free from corrupting physical effects. An initial reconstruction is performed at 187. Initial reconstruction 187 is performed in some configurations by computing Q(x,y,z) or B(x,y,z) from qi(u,v). From this Q(x,y,z) or B(x,y,z), an appropriate energy to minimize as well as parameters for the minimization may be chosen. An energy definition is chosen at 188 either (a) automatically in accordance with image information, (b) as a default energy, which may depend upon x-ray technique and/or breast thickness and/or other similar physical parameters, or (c) by interaction with a user, such as by interactively choosing from a list of default energies, or (d) a combination of (a), (b), and/or (c). The energy definition at 188 includes at least one term that constrains the reconstructed volumetric image to a material class volumetric image, B(x,y,z), for example, such that every voxel in the material class volumetric image contains only one value (or label) corresponding to a single material class each. Parameters associated with the energy definition selection may also be chosen from the initial volumetric image Q(x,y,z) or B(x,y,z). An N-ary reconstruction is performed at 190 by estimating a volumetric image, B(x,y,z), that produces the smallest value of the reconstruction energy functional. This reconstruction can be performed using a) optimization methods b) energy computations over a random search of volumetric images, B(x,y,z), or c) exhaustive search (which will produce the absolute minimum of the energy functional and the optimal volumetric image for the energy). In one configuration of the present invention, the energy functional contains a term which increases in value as the voxel intensities in the constrained volumetric image, B(x,y,z), differ from voxel intensities corresponding to the material classes in a hypothesized model of the breast. In this case, the energy functional contains an N-ary material class enforcement term such that the value of the N-ary material class enforcement term is minimal when B(x,y,z) contains only the material classes in a hypothesized model of the breast (e.g. the term achieves its minimum value when B(x,y,z) contains only labels that correspond exactly to one of a plurality of material class labels or B(x,y,z) contains only values that are elements of the material classes—for instance, a two material model may consist of a voxelwise glandular or fatty material class labeling). An energy minimizing reconstruction algorithm 190 configured to enforce an N-ary, or approximately N-ary, material class volumetric image reconstruction will select a volumetric image, B(x,y,z), that, among candidate volumetric images, minimizes the reconstruction energy functional. That is, the output volumetric image, B(x,y,z), is an N-ary volumetric image. (In some configurations, a minor, but not necessarily preselected portion of the reconstructed volumetric image is permitted to correspond to one or a small number of other types of tissues.) Any necessary post-processing steps can be performed at 192, including iterating the reconstruction of steps 186, 188, and 190.

In some configurations of the present invention, the difference between the % Gi estimates from a plurality of projection images qi(u,v) or reprojection images ri(u,v) from B(x,y,z) and some nominal % G for the volumetric image, B(x,y,z), is included in the energy functional to produce % G-consistent volumetric images from the projection dataset. Such a constraint may be incorporated into the energy functional as GC(B), where GC(B) is smallest where the % Gi estimates are aggregately closest to some nominal % G or representative % G, and where GC(B) is larger as the estimates of percent glandular vary from the nominal estimate or amongst themselves. In some configurations the % G value for the current estimate of the volumetric image of the object is determined directly from B(x,y,z) (or Q(x,y,z)) without computing the corresponding re-projected images.

Energy functional minimization approaches have been considered for a wide array of multidimensional processing and information extraction tasks, including edge-preserving smoothing, tomographic reconstruction, general image restoration, image in-painting, curve evolution, and segmentation, among others. These individual applications each have specific energy formulations which define the properties of the resulting processed fields (any image or 3D volumetric image, e.g., is a field). Many known energy definitions are intended for processing of observations which are already reconstructed data (slices, images, or full 3D volumetric images). These energies, although not tomosynthetic reconstruction energies specifically, are important because they can be tied into an overall conglomerate energy, as defined below. Specific energy definitions with more or less limited scope of application are known and have been proposed for a number of different reasons, and include a number of different terms with different properties. By contrast, some configurations of the present invention consolidate these terms into an overall conglomerate energy functional that has properties that are a function of all such terms, or at least of a plurality of specific energy definitions. For example, in no prior art, have reconstruction algorithms been derived from material class decomposition constraints. Specifically, no tomographic (tomosynthetic) reconstruction algorithm has ever been derived from an energy which contained at least one term that enforced an "N-ary" decomposition of the imaged volume—that is, the minimizer of the energy functional is an "N-ary" volumetric image.

A straightforward energy minimization approach to solving a tomographic reconstruction problem is a least squares solution. In this case, the squared error between the projections of the volumetric image and the observed projections is minimized. This approach is often referred to as solving an unregularized "inverse problem" where the effect of "projecting" the imaged object is "inverted." This may also be referred to as minimizing the quadratic fidelity term (which represents the energy functional, or a term in a more complex energy functional). Although a closed form solution in the least squares sense can be achieved, unregularized solutions to inverse problems often suffer numerical instabilities (high condition number). In most tomographic problems, especially limited angle tomographic reconstruction problems, the unregularized solution (a volumetric image, for example) is (mathematically) not uniquely determined, which can lead to high spatial frequency artifacts. To mitigate the numerical stability issues associated with the simple least squares energy, a side constraint is added to the energy. This side constraint is termed the "regularizer". In virtually all energy minimization methods for tomographic reconstruction, the art lies in defining suitable side constraints so that the reconstruction enjoys desirable properties. Tikhonov proposed side constraints which were quadratic penalties on the actual values of the reconstructed field (A. N. Tikhonov, V. Y. Arsenin, "Solutions of Ill-posed Problems," Wiley, New York, 1977.). Note that energy formulations of the reconstruction problem may lead to identical solutions to reconstruction algorithms already proposed in the prior art. The Tikhonov energy definition above, for example, is minimized by the volumetric image produced by iterating the additive ART algorithm to convergence. For some applications, it is more appropriate to add a quadratic penalty on the derivative of the reconstructed field because although little may be known about the actual values the reconstructed field should take on, it may be known that the field should be smooth. (A. N. Tikhonov, V. Y. Arsenin, "Solutions of Ill-posed Problems," Wiley, New York, 1977) Such approaches are only of limited value, however, because the quadratic penalty on the derivative rapidly removes edges from solutions (volumetric images, for example) (edge oversmoothing), which are often important sources of information in imagery. To mitigate the edge oversmoothing problem, Osher and Rudin proposed the Total Variation energy (S. Osher and L. Rudin, "Feature-oriented image enhancement using shock filters." SLAM journal of Numerical Analysis, 27(4):919-940, August, 1990), which is a sum of a quadratic fidelity term and the sum of absolute values of the derivative function (e.g., adjacent pixel/voxel differences). Total variation solutions often compare favorably to reconstructions where Tikhonov derivative side constraints are used. Still some investigators have gone further. Specifically, to smooth regions and still allow the formation of edges, the Mumford Shah energy functional includes an explicit estimate of the boundaries between regions (D. Mumford, J. Shah, "Boundary detection by minimizing functionals, I." In Proc. of the IEEE Conf. On Computer Vision and Pattern Recognition, pages 22-26, 1985.). Using this information, the Tikhonov derivative side constraint or the Total Variation energy can be minimized where the derivative penalty is relaxed where an edge is indicated by an auxiliary boundary field. Such approaches suffer numerical issues in their solution because the minimization requires the joint estimation of a reconstructed volumetric image (3D or 2D field, e.g.) and a segmenting curve (2D surface or ID curve, e.g.). To alleviate those numerical issues, other investigators reformulated the binary nature of the segmenting curve to be an auxiliary edge field (instead of a curve in space) (L. Ambrosio, V. M. Tortorelli, "On the approximation of free discontinuity problems," Bollettino Della Unione Matematica Italiana, 6-B:105-123, 1992.). This reformulation allowed faster solution methods such as coordinate descent on the joint set of fields. Other approaches to minimizing a variant of the Mumford Shah functional enforce the constraint of estimating a closed curve, which permits the use of fast numerical methods, such as level set methods, for the solution method (A. Tsai, A. Yezzi, A. S. Willsky, "Curve Evolution Implementation of the Mumford-Shah Functional for Image Segmentation, Denoising, Interpolation, and Magnification," IEEE Trans. On Image Proc., Vol 10, No. 8, August 2001.). In addition to penalties on the spatial derivative of the reconstructed values, the reconstructed values may themselves be constrained to have a specific intensity distribution. For instance, the values of the reconstructed volumetric image may be constrained to be samples of an intensity distribution defined by a Gaussian mixture model (W. M. Wells, W. E. L. Grimson, R. Kikinis, "Adaptive Segmentation of MRI data." IEEE Trans. On Med. Imag., 15(4):429-442, August 1996.). Still other energies incorporate terms which depend on the shapes of structures and their registration with corresponding images from other modalities or from the same modality with different acquisition parameters (T. F. Cootes, C. Beeston, G. J. Edwards, C. J. Taylor, "A Unified Framework for atlas matching using active appearance models" in A. Kuba, M. Smal, and A. Todd-Pokropek, editors, Lecture Notes in Computer Science 1613: Information Processing in Medical Imaging, volume 1613, pages 322-333. Springer Verlag, 1999.). Such energies include terms which depend on the relative locations of structures, the intensity dependence on relative location, and the expected curvature (or other shape/morphology descriptor) in different anatomical regions.

Once the energy is defined, the reconstruction method can be considered an optimization problem. There are well-known published methods for optimizing (finding minimizers of) energy functionals. These commonly include Newton and quasi-Newton methods which implement Hessian updates at each iteration of the minimization process. Davidon-Fletcher-Powell (DFP) and Broyden-Fletcher-Goldfarb-Shanno (BFGS) methods, among others, can be used in such a scenario. For energies which have as components, penalties which are absolute values of fields or auxiliary fields, parts of solution methods may be formed from linear programming approaches, such as simplex methods or Karmarkar's methods, e.g.. A host of minimization approaches, such as coordinate descent, gradient descent, simulated annealing, among many other published and well-studied minimization and optimization methods, may be used for the minimization of any given energy.

Specifically, gradient descent methods update a plurality of the independent variables in the energy at each step. The gradient descent method requires 1) an estimate of the local gradient of the energy functional computed at the current estimate of the field and 2) a line search in the direction of greatest descent of the energy gradient. To address the first requirement, the gradient of the energy at a given estimate of the field must be estimated; this can be accomplished using the analytic expression for the continuous or discrete version of the gradient of the energy, itself (Y. Saad, "Iterative Methods for Sparse Linear Systems." The PWS Series in Computer Science. PWS Publishing Company, a division of International Thomson Publishing, Inc., PWS Publishing Co. Boston, Mass., 1996.), by numerically estimating the gradient from the observations (Matlab Optimization Toolbox Manual, http://www.mathworks.com/products/optimization/), or using stochastic methods (Viola, P. A., "Alignment by Maximization of Mutual Information", MIT AI Technical Report No. 1548, June, 1995.). There are a host of line search algorithms in the published literature to address the second requirement. These line-search algorithms include linear searches, logarithmically spaced searches, and constant step size searches (W. H. Press, B. P. Flannery, S. A. Teukolsky, W. T. Vetterling, Numerical Recipes, Cambridge Univ. Press, Cambridge, UK (1986)).

Because the Tikhonov regularization energy is quadratic, its minimization in the reconstruction is linear. Thus, the Tikhonov regularized reconstruction can be solved using a linear equation solver, such as direct inversion, standard or preconditioned conjugate gradient, multigrid methods, or Monte Carlo methods. We will group these methods under the umbrella term, linear equation solvers. (A. N. Tikhonov, "Regularization of incorrectly posed problems," Soviet Math. Dokl, vol. 4, pp. 1035-1038, 1963.)

The heat equation (as one example of an energy minimization problem) can be solved by convolving the observed field with a gaussian distribution of unit mass whose variance is proportional to the time the field's temperature has been "flowing". It is conceivable that convolution with some other kernel which is different from a gaussian distribution would lead to the solution to some other minimization problem. We will group all solution methods which can be solved by convolution under the umbrella term, convolution methods (Koenderink, J., *The structure of images*. Biol. Cybern. 50, 363-370, 1984.).

Total variation-type energies, including Vogel's and Cetin's, can be minimized using half quadratic minimization and/or gradient descent techniques together (C. R. Vogel and M. E. Oman, "Fast, robust total variation-based reconstruction of noisy, blurred images," IEEE Trans. On Image Processing, vol. 7 no. 6, pp. 813-824, June 1998, "Feature-enhanced synthetic aperture radar image formation based on nonquadratic regularization," Müjdat Cetin and W. Clem Karl, *IEEE Trans. Image Processing*, vol. 10, no. 4, pp. 623-631, April 2001.)

The Wells EM adaptive segmentation energy, which includes terms that minimize the effect of a slowly varying additive field (the bias field) and terms that penalize the deviation in intensity value from a given intensity model distribution can be solved by interpreting the energy as proportional to the log likelihood function of the underlying probabilistic model for the field and then using expectation maximization methods to compute the maximum likelihood estimate of that field (Adaptive segmentation of MRI data. Wells W M, Kikinis R, Grimson W E L, Jolesz F. *IEEE Transactions on Medical Imaging*. 1996; 15:429-442).

Energies akin to Shah's and Yezzi's, which may include an explicit boundary term as an auxiliary field, can be minimized using modified level set methods as described by Sethian. (A. Tsai, A. Yezzi, and A. Willsky, "A curve evolution approach to smoothing and segmentation using the Mumford-Shah functional," Proc. IEEE Conf. On Computer Vision and Pattern Recognition, June 2000, T. Chan and L. Vese, "A level set algorithm for minimizing the Mumford-Shah functional in image processing," UCLA Technical Report, 2000.)

The Ambrosio Tortorelli energy, which includes both a reconstruction of the field as well as an auxiliary edge strength field, can be minimized in a coordinate descent framework. In this approach, the edge strength function is minimized with respect to the reconstruction, and then fixing the reconstruction is minimized with respect to the edge strength function. In each step of the coordinate descent, a linear equation solver is used. (Energy Formulations of Medical Image Segmentations, Ph.D. Thesis, J. Kaufhold, Boston University College of Engineering, Aug. 11, 2000.)

In other iterative approaches of the prior art, the energy functional is not explicitly formulated, but the reconstructed volumetric image is assumed to be subject to certain additional constraints (which can alternatively also be formulated as explicit terms in an energy functional) Examples of these approaches include additive ART, and multiplicative ART (MART) (Verhoeven, D., Limited-Data Computed Tomography Algorithms for the Physical Sciences, Appl. Optics, vol. 32, no. 20, July 1993), which both aim at satisfying the re-projection constraint (i.e., they minimize the least squares fidelity term). These iterative methods can be combined with additional constraints, for example by alternating the ART iteration step with an additional update step that modifies the current estimate of the reconstructed volumetric image such that it satisfies the additional constraints. The same type of approach can be used with other reconstruction methods, like Fourier based reconstruction (B. Claus, M. Yavuz, B. Opsahl-Ong, A Fourier Based Method for Optimal Reconstruction in Digital Tomosynthesis, GE GRC disclosure RD-27853, December 1999, patent filed June 2003), Matrix Inversion Tomosynthesis (MITS—Dobbins III, J. T., Matrix Inversion Tomosynthesis Improvements in Longitudinal X-Ray Slice Imaging, U.S. Pat, No. 4,903,204, filed December 1987), Direct ART (DART—B. Claus, A Non-Iterative Algebraic Reconstruction Technique for Tomosynthesis, GE GRC disclosure RD-30968, August 2002, patent filed September 2003), Generalized Filtered Backprojection (GFBP—in Claus BEH, Eberhard J W, Thomas J A, Galbo C E, Pakenas W P, Muller S: Preference Study of Reconstructed Image Quality in Mammographic Tomosynthesis, IWDM 2002—Proc. $6^{th}$ Intl. Workshop on Digital Mammography, Bremen, Germany, 2002, Springer 2003, also B. Claus, J. Eberhard, Generalized Filtered Backprojection Reconstruction in Digital Tomosynthesis, GE GRC disclosure RD-29603, August 2001, patent filed April 2002), Filtered Backprojection (FBP—Yavus, M., Edic, P. M., Ishaque, A., N., Patch, S. K., Method and Apparatus for Reconstructing Image data Acquired by a Tomosynthesis X-Ray Imaging System, U.S. Pat. No. 6,292,530 B1, Sep. 18, 2001.) etc. by alternatingly applying the steps of reconstruction, applying constraints to reconstructed volumetric image, re-projection and reconstruction of differences and update of reconstructed volumetric image.

In known methods for the minimization of the energy functional and the representation of the data that is utilized in the implementation, the minimization is not worked on a continuous field, but rather on a discrete grid of points. More specifically, the field is defined on a regular lattice and computations are performed using values defined on the lattice. However, for discussion, it is often easier to illustrate similarities to prior art in the context of a continuous rather than a discrete formulation of the reconstruction energy.

For instance, in the continuous versions of the energy formulations that appear in the literature (the formulations are often described in the continuous domain and then discretized later), significant emphasis is placed on the exponents on specific energy terms or parts of energy terms. These exponents can be thought of as a norm in the space of discretized counterparts to the continuous expressions for the energies. For instance, the discrete version of the fidelity constraint defined by:

$$E_{PD}(v) = \int_{projections} |P(v) - y|^{q1} \, dp$$

where $E_{PD}$ is the energy, the integral is over all the projection data acquired. The term $P(v)$ indicates the projection of the reconstructed 3D volumetric image, v, into the space of the observed projections, y, and q1 is a scalar exponent. The discrete counterpart to $E_{PD}(v)$ can be written as $$E_{PD} = \|Pv - y\|_{q1}^{q1},$$

where in the discretized formulation, P is a matrix operator acting on (typically lexicographically ordered) volume data, v is the (typically lexicographically ordered) reconstructed volume, and y is the observed projection data. In the discrete version, q1 indicates the norm space. To use the terminology from the first part of this patent application, Pv in the equation corresponds to the lexicographically ordered pixel intensities of ri(u,v), the re-projections corresponding to B(x,y,z), or qi(u,v), the re-projections corresponding to Q(x,y,z). Likewise, y in the equation is the observed tomosynthesis projection dataset (also lexicographically ordered). The elements of y may be populated with pi(u,v), or qi(u,v), if available. Although almost all the development from here on is discussed in a continuous energy formulation (to facilitate discussion of prior art), the discrete versions of these energy formulations can be written with the substitutions stated for all energy terms described below—this provides a substrate for comparing reconstruction algorithms defined above with specific energy terms defined below. An example minimization of the discretized energy is shown to illustrate the correspondence of the minimization of the continuous formulation of the reconstruction energy functional to the discretized version. For q1=2, for example, the discretized formulation can be written as follows:

$$E_{PD} = v^T P^T P v + y^T y - 2 y^T P v$$

For this example, minimizing this discrete energy with respect to v is straightforward. Setting to zero the derivative of the energy with respect to v yields:

$$0 = \frac{\partial}{\partial v}(E_{PD} = v^T P^T P v + y^T y - 2 y^T P v)$$

$$0 = 2 P^T P v - 2 P^T y$$

$$2 P^T P v = 2 P^T y$$

$$v = (P^T P)^{-1} P^T y$$

There may not always be a closed-form solution for each energy functional described herein, but all will have a discretized counterpart to their continuous formulation similar to this example.

We define below components of an energy functional (also called energy herein), many of which are known in the literature. Each energy component (also called energy term) may be considered a specific energy definition. However, known techniques have not included a unified conglomerate energy functional that takes into account many known component energies. We claim such an energy functional, which is a combination of energy terms, some of which are known in the art. In this way, the specific energy functionals defined in the literature are special cases of the energy we define here and for clarity we will spell out the relationship between published energies and this one in the section that follows the general energy definition.

In general, the individual energy components (specific energy definitions) in a functional aim to constrain specific properties of the reconstruction. In order for the reconstructed volumetric image to bear any relationship to the observation of the volume (x-ray projection), there must be some "data consistency" constraint, often termed the "fidelity constraint." In tomographic reconstruction energy functionals, these fidelity constraints take the form of a reprojection consistency energy (as discussed above) or some approximation thereof. In addition to the projection image dataset, there may also be another observation of the volume with another modality, such as ultrasound, optical imaging, or magnetic resonance. For instance, if a volumetric image of the breast hull of the imaged breast is available (or the compressed breast thickness estimate only), it may be used to constrain where attenuation coefficients (voxel intensities in the volumetric image, for example) have values corresponding to tissue or air. Also, because the x-ray attenuation coefficients are well-modeled quantities as a function of the tissue type, the volumetric image's voxel values should reflect that. For instance, in a breast, tissue is either fat-equivalent or glandular-equivalent. This intensity model constraint on the actual intensity values of the volumetric image is valuable and can be incorporated into its own energy term. Some energy terms carry with them a tacit boundary hypersurface which has its own measurable properties—this hypersurface can, itself, be constrained with an energy term. For instance, some organs, like the heart, are known to have smooth boundary surfaces. This knowledge of internal geometry can be incorporated directly into an additional energy term on the 3D curvature of the boundary surface. Other smoothness constraints on the contiguity (and/or smoothness) of anatomical structures can also be incorporated in a similar way. In addition to broadly constraining the internal geometry of the hypersurface based on metrics defined on its own boundary surfaces, an external geometry term may capture other properties of the boundary hypersurface, such as its location embedded in the anatomy or metrics on the shape of the object compared to a model shape for the given anatomy. Such external geometry and location information can be incorporated into individual components of an energy term. In addition to the prior knowledge of the modality and observation process, the acquisition system, configuration, and other terms of the reconstruction energy functional may introduce or lead to certain types of artifacts. Because the artifact severity may be affected by the acquisition geometry, hardware settings, and other system-dependent factors, one or more terms may be added to the energy functional to specifically measure and penalize artifacts. Given this overview of the types of constraints imposed in configurations of the present invention, we next describe examples of the individual energy components corresponding to them.

In the paragraphs defining each component energy term, an example of an analytic expression for the energy component is given. However, this analytic expression is not necessarily the only expression suitable for that energy component: More particularly, any expression that has some or all of the qualitative properties described for each component energy term may be used. Therefore, the analytic expressions provided as examples should not be construed as limiting the energy functional definition. In some configurations, some energy terms may be obviated by another term or a collection of other terms in an energy functional—in these configurations, the less general term may be dropped from the definition. In one configuration, an individual term may be bounded by some appropriate maximum value, or may be set to zero if it is less than some appropriate tolerance value.

Projection domain fidelity constraint (reprojection consistency): In tomographic reconstruction, the projection of the estimated volumetric image into the same space as the acquired projections should be essentially the same. This property is called the reprojection consistency constraint. There may also be some correction applied to the reprojection consistency constraint to account for other effects, such as beam hardening. One realization of an energy term quantifying the reprojection consistency is:

$$\int_{Projections} (P(v+G)-y)^{q1} dp$$

where P(v+G) is the projection of the sum of the reconstructed volumetric image, v, and an artifact field (volumetric image), G, into the same space as the acquired projection images, y, and q1 is a scalar exponent. The artifact field may be, for instance, a field that compensates for physical effects, such as beam hardening and/or system noise.

More generally, the fidelity constraint may be defined more loosely as:

$$\int_{Projections} T(v, G, y) dp$$

where T is a penalty on some metric which differentiates the observed projections, y, from the expected projections from the joint estimate of v and G. This broader definition is just one example of how each energy term (including the ones described below) may be relaxed. The specific analytic expression should not be construed as limiting, but rather construed as tools to make the concept of conglomeration clear.

In a less restrictive form of the re-projection constraint, one can use moment-based arguments to constrain the volumetric image. For example, the projection of the center of gravity of an object (which is the 0-th order moment) is the center of gravity of the projection, and we have similar relationships between the higher order moments of the object, and the higher order moments of the projection images, and it is easy to develop energy functionals which take these relationships into account. These moment-based energy functionals can the be used in the computation of the reconstructed volumetric image.

Volumetric image domain fidelity constraint: For some energy functionals, it is more convenient, though in some cases mathematically identical, to write the fidelity constraint not in the projection domain, but in the reconstruction domain (the domain of volumetric images, for example). One realization of the fidelity constraint is:

$$\int\int_{Regions} |y_R - (v+G)|^{q2} dR$$

In the equation above, $y_R$ is the observation in the reconstruction domain (for example, this may be a simple min norm least squares solution of the observed projections through the projection operator, P), v is the reconstructed volumetric image, G is an artifact field (volumetric image), and q2 is a scalar exponent. In addition to estimates of the reconstruction under consideration, v, this type of term may also penalize deviations from reconstructed volumetric images from previous years or from other modalities. In such cases, additional volumetric image registration steps may be necessary to bring the other exams into registration with the one under consideration, but in principle, those estimates may be incorporated here.

Edge-preserving smoothness constraint: Regions are assumed to be essentially smooth (i.e., no discontinuity in image intensities) except at the boundaries between two objects of different intensity (edges). This constraint can be used by locally penalizing the derivative of intensity values of the voxels of the reconstructed volumetric image, v, for example. Thus, higher quality processing results are achieved with a combination of 1) smoothing 2) edge preservation, which are competing processes. In many edge detection schemes, the edge field is not a curve or surface in space (as we conceptualize edges), but rather a field of "edge strengths". For instance, a saturating function of the gradient of an image is one approach to defining an "edge strength" function from the field's spatial gradient. One energy definition that formalizes the balance between these two forces can be written as follows:

$$\int\int_{Regions} (1-s)^{q3} |\Omega(\nabla v, C)|^{q4} dR$$

where s is an edge strength field (volumetric image) between 0 and 1 (s~0 being smooth and s~1 being an edge), q3 is a scalar exponent, $\Omega(\nabla v, C)$ is a weighting function on the local derivative field $\nabla v$, conditioned on a curve in space, C, and $\nabla v$ is the gradient of v and q4 is a scalar exponent. Where there is no edge (s=0), the gradient is penalized (leading to smoother regions in that area). Where there is an edge (s=1), however, the penalty on the gradient is relaxed, and large differences between neighboring pixels/voxels are allowed. The volumetric image intensities in v do not have to correspond only to a homogeneous material class. The intensities on v may, be a metric for local "texture". In this way, smoothness can be enforced on individual texture metrics.

Intensity model (N-ary material class) constraint: In addition to the spatial smoothness of intensity values in regions of the volumetric image, v, for example, there may be a priori information available on the intensity distributions of the actual intensity values of the reconstructed volumetric image, v, for example. For instance, in x-ray tomographic imaging, the reconstructed volumetric image is theoretically a field of x-ray linear attenuation coefficient values. The most general constraint will thus penalize any value in the volumetric image that does not lie in the physically possible range—in medical x-ray imaging typically between 0 (no attenuation) and bone (maximum attenuation). A more detailed constraint may use the fact that the linear attenuation coefficients for different tissues within a reconstructed volumetric image are distinct, and not mixed. Such a constraint may even be used in combination with a prior model on where certain tissue types/material classes (and thus certain attenuation parameters) are likely to be present. One energy definition that penalizes large deviations from specific intensity levels is as follows:

$$\iint_{Regions} |\Phi(v,\mu)|^{q5} dR$$

where $\Phi(v,\mu)$ is a function that takes the reconstructed volumetric image, v, into the intensity model domain, $\mu$, so that it may be compared to $\mu$, where $\mu$ is a prior model of expected intensities in v, v is the reconstructed volumetric image, $\mu$ is the intensity model (which may comprise a spatial model with information about where certain intensities are expected), and q5 is a scalar exponent. For instance, it may be known that the intensities of a reconstructed volumetric image, v, fall in narrow distributions of distinct intensity value ranges (corresponding to material classes), described by the class means, $m_i$, and the class spreads (standard deviations, for example), $s_i$. If, for instance, a voxel came from 1 of 2 different tissue classes, with means, $m_1$, and $m_2$, respectively, the contribution to the energy functional at that voxel location might be larger for voxel intensity values at that location further from either $m_1$ or $m_2$ compared to the contribution to the energy functional at that voxel if its intensity were closer to either $m_1$ or $m_2$. The model, $\square$, may itself depend on any field or variable in the energy functional, including v. This can be thought of as an N-ary volumetric image because depending on $\mu$, the actual intensities may be attracted to specific ranges of values, or even fixed levels. The model (also called prior model), $\mu$, can be thought of as a spatially varying prior distribution on intensity range of material classes of the reconstruction, v, for example. The prior model, $\mu$, may depend on an image or observation from the patient history, more generally, while the values m1 and m2 can be obtained through suitable calibration procedures (or may already be available from tables in the published literature).

For specific applications, variants of a two-tissue reconstruction can be used. In this case, the intensity model can be considered a mixture model where the peaks of the mixtures occur near the attenuation coefficient values for the different tissues. For instance, in mammograms, the mixture model would be a sum of probability distributions in the intensity domain. The peak of one mixture would fall at the attenuation coefficient for fat and the peak of the other mixture would fall at the attenuation coefficient for glandular-equivalent tissue.

Structural shape constraint: Because the N-ary material class constraint described above may not disambiguate all structures, additional constraints may be incorporated as a model of the breast. These models may take into account physical characteristics of structures in the reconstructed volumetric image. An example of another parametric prior model for the breast, $\square$, is that the breast is composed of a number of structures embedded in a volumetric image of fatty-equivalent tissue. In one embodiment of the invention, the structures are selected from the group consisting of fibrous structures, glands, Cooper's ligaments, microcalcifications, fibroadenomas, architectural distortion and combinations thereof. Each type of structure may have its own set of shape or structural parameters. For instance, the fibers may be composed of fiber segments, each with a set of parameters. These parameters may include a characteristic length, an orientation, a cross-sectional shape, a bending parameter, a taper parameterization, etc. Each type of structure may have its own identifying parameters. The most likely set of tissue structure parameters that best explains the reconstructed voxel intensities in the volumetric image, v, would correspond to the lowest value of the energy functional. By computing the energy for a search space of possible tissue structure parameter sets, the reconstruction is the set of tissue structure parameters, or the volumetric image, v, corresponding to that set. Such an approach can also be defined probabilistically, where the model indicates the probability of a parameter set given the observed voxel intensities.

In one configuration of the invention, the energy functional includes a term where the N-ary volumetric image is constrained to contain material class anatomical shapes that are similar to real anatomy. Material class anatomy shapes are clusters of voxels in v, which consist mostly of one material class. For instance, v may contain localized clusters of material classes that do not correspond to real anatomical shapes. For a volumetric image, v, which contains unlikely shapes as localized components of the volumetric image, the shape energy term, S(v) will be high. For a volumetric image, v, that contains localized components which resemble real anatomical structures (ligaments, glands, etc.), the shape energy term will be small. In one configuration, the shape energy term penalizes the 3D morphology of the reconstructed N-ary volumetric image. In one configuration of the reconstruction algorithm, for isolated voxels of a single material class surrounded by a plurality of other voxel labels, the shape energy term will be high.

Cross-modality fidelity constraint: The model may be partially determined by another set of medical image data which is coregistered with the reconstruction. For instance, when reconstructing an x-ray tomosynthesis dataset, corresponding ultrasound imagery warped into the same coordinate system as the volumetric image, v, may be used to constrain the reconstruction. Likewise, a plurality of prior years' exams, each of which is warped into the coordinate system for the current exam, may provide a number of additional constraints for reconstruction. Depending on the application, the registration step may be omitted and the constraint derived from the collateral observation of the anatomy can be comparatively relaxed. To distinguish the role of the prior year's or collateral modality volumetric images for use in the model constraints from use in the fidelity constraint, it is intended here that prior years' or collateral modality exams influence the model, $\mu$, rather than be included in this term as a specific fidelity constraint (like they are in the description above).

In one configuration of the invention, the energy functional includes a term where the volumetric image is constrained such that the estimate of a volumetric image, v, e.g., is constrained by a volumetric representation of the same object using another imaging modality. The alternate modality's volumetric image representation may be registered with v to exist in the same coordinate system (after registration, for example). In one configuration, the second imaging modality is ultrasound, and a volumetric image corresponding to the ultrasound modality is used to constrain the voxel intensities in v. This cross modality term in the energy functional is minimal where the volumetric image corresponding to one modality, U(x,y,z), for example, is mapped voxel-by-voxel to the volumetric image corresponding to the tomosynthesis dataset, v. As the differences between the volumetric images corresponding to each of the tomosynthesis and ultrasound modalities increases, the cross modality energy increases.

Boundary field model constraint: This term is used to constrain properties of the edge field (volumetric image) such as the shape/total number and/or intensity of edges in the edge strength field. It is conceivable that the edge strength function has an associated spatially dependent intensity model as does the reconstructed volumetric image, v. That is, just as certain tissue attenuation coefficients are more likely in some regions of a reconstructed volumetric image than others (bone attenuation coefficients are more likely in the vicinity of the spine in chest reconstructions), specific edge strength values are more likely in certain regions than others. For instance, large intensity jumps may be expected in locations where tissue and air share an interface, but smaller jumps may be expected where fat and glandular tissue share an interface. One example of an energy that captures both the elements of an edge strength function and its model is as follows:

$$\iint_{Regions} |\Psi(s,\sigma)|^{q6} dR$$

where $\Psi(s,\sigma)$ is a function that takes the estimated edge field, s, into the boundary model domain, $\sigma$, so that it may be compared directly to $\sigma$, s is the edge strength field, and $\sigma$ is a prior model of expected boundary properties, and q6 is a scalar exponent. The model, $\sigma$, may itself depend on s or any other auxiliary field ($\mu$, for example) in the energy.

Intensity model probability constraint (and shape constraint on regions): It may be known a priori that there are specified amounts and shapes of tissue in the reconstructed anatomy. For instance, it may be known that only 2% of all tissue in a chest reconstruction is bone. If the spatially dependent tissue intensity model indicates through some metric on the model that its overall selection for bone is much higher or much lower than that, the intensity model, $\mu$, may be modified to better reflect what is known a priori about the amount (and/or shape) of tissue in the reconstructed anatomy. One example of such an energy term is as follows:

$$\iint_{Regions} |T(\mu)|^{q7} dR$$

where $T(\mu)$ is a function that is large for unlikely models, $\mu$, and smaller for more likely models, $\mu$, $\mu$ is the spatially dependent prior model on intensities of v, and q7 is a scalar exponent. The prior model, $\mu$, may depend on another modality. The prior model may also depend on high-level representations of v. For instance, although v is nominally a volumetric image of intensities, where the intensity indicates the tissue composition at a given voxel, a higher-level representation of v is as a convex hull (e.g., the breast hull as described above). The convex hull may describe where it is known with high certainty, that there is no tissue in the volumetric image. Likewise, the higher-level representation may include an integral measure of the squared intensity in the background of the volumetric image.

Boundary field model probability constraint: This term, like the constraint on the intensity model, constrains the prior model on the edge strength field, s. For instance, if it is known a priori that edges will not develop in a given region of an image, in a region of v, for example, then a prior model of the edge strength function, $\sigma$, which allowed the edge strength function, s, to develop large edge strength values in that region would be penalized more than one that did not allow the edge strength function to develop edges in those regions, all other parts of $\sigma$ being the same. One example of an energy that captures the penalty on the model is as follows, $$\iint_{Regions} |\Lambda(\sigma)|^{q8} dR$$

where $\Lambda(\sigma)$ is a function that is large for unlikely boundary field models, $\sigma$, and smaller for more likely boundary field models, $\sigma$, and q8 is a scalar exponent.

Bias field (low frequency artifact) constraint: In some cases, there may be artifact terms in the reconstructed volumetric image that are taken into account explicitly with the G field. For instance, the G field may account for the slowly varying additive corruption of the intensity (e.g., attenuation coefficient) field, v, due to beam hardening. The bias field constraint is added to "source separate" the artifacts from the real attenuation coefficient field signal. Source separation means in this context that the source of the attenuation contribution is decomposed into a part that is due to the material classes in the true volumetric image, v, and another part, G, corresponding to all other contributions to the reconstruction (for example, artifacts such as beam hardening effects, etc.). This penalty is designed so that, nominally, only the anatomically relevant signal is contained in the volumetric image, v, and only the part of the signal that has to do with artifacts of the imaging system are contained in the volumetric image, G. One example of an energy that captures the penalty on the imaging artifact field is as follows:

$$\iint_{Regions} |M(G)|^{q9} dR$$

M(G) is a function that is large for both unlikely artifact fields, G, and for artifact fields, G, that resemble true tissue structure. M(G) is smaller for more likely artifact fields or fields that have few of the properties of real tissue structure. G is the artifact field, and q9 is a scalar exponent. For instance, if the artifact field is known to be a slowly varying field in space, M(G) could be a measure of the high frequency energy (or derivative magnitude) in G.

Artifact minimizing constraint: In backprojection-type reconstructions in limited angle tomosynthesis, high contrast structures appear not only at their true location, but copies of them also exist at locations along lines that join the location of the structure and the different focal spot locations of the radiation source (as well as the corresponding pixel locations on the detector). To avoid this type of artifact in our framework, this energy term can be defined as an artifact "detector". In this way, the energy increases where artifacts are detected (are present in the reconstructed volumetric image) and decreases for reconstructed volumetric images where artifacts are not detected. One example of an energy that captures the penalty on artifacts is as follows:

$$\iint_{Regions} |A(v)|^{q10} dR$$

where $A(v)$ is a measure of the artifacts in v, v is the reconstructed volumetric image, and q10 is a scalar exponent. In this term, artifacts may be explicitly modeled so that they may be suppressed in the reconstructed volumetric image, v. For instance, $A(v)$ may be large for reconstructed volumetric images where copies of the high-contrast structures are spread into adjacent planes of the volumetric image, and smaller for reconstructed volumetric images where such an artifact is reduced. A(v) can be thought of as a filter whose value is larger for reconstructed volumetric images, v, with more severe artifacts and smaller for less severe artifacts. In this term, there may be a constraint that makes structures which are blurred more in the "depth dimension" (i.e., in the direction essentially along the direction of projection) contribute more to the energy than structures which are more distinct in the depth dimension.

Boundary property (shape/boundary length, for example) constraint: In general, the aim of the boundary property constraint is to establish constraints on location, shape, smoothness, closedness, openness, etc., of boundary hypersurfaces. In one configuration of the present invention, a segmentation method evolves a closed n-1 dimensional hypersurface embedded in an n-dimensional field under the influence of an edge strength function (external force) and a curvature-dependent bending force (intrinsic force). The dimensionality, n, for example, may be 3 for a three-dimensional volumetric image, v, and the boundary hypersurface may be 2 dimensional in that case. When the hypersurface comes to equilibrium (intrinsic and external force balance), that surface is taken to be the boundary separating different tissues (material classes). Other forces may also govern the motion of the hypersurface in the field, such as the mean intensity values in and outside the hypersurface. In general, the forces of the hypersurface evolution are created not solely by the image data, itself, but from some prior knowledge of the expected properties of the boundary, such as its expected location in the anatomy of interest, its expected shape or other expected properties. To incorporate the influence of a prior model on the hypersurface into the energy, one can define $$\iint_{\substack{Tissue\ Surface\\ Interface\ Properties}} |Z(C, C_\mu)|^{q11} dS$$

where $Z(C,C_\mu)$ is a function that measures a number of properties of the curve (or surface), C, and computes some distance (diffeomorphism, Hausdorff metric, weighted parameter difference, etc.) to another curve (or surface), $C_\mu$; C is the curve (or n-1 dimensional hypersurface) in space, $C_\mu$ is the model for the given tissue surface interface and q11 is a scalar exponent. The model curve may depend on any of the other fields in the energy minimization. The motion of C may depend on any other field in the energy minimization as well—for instance, the external force may be attracted to large values of the edge strength function, s.

Energy Summary: To summarize, we presented a number of different types of energy components above. We broadly group these components analytically into a projection domain energy term, a reconstruction domain energy term, and a boundary domain energy term. This classification is only for the purposes of elucidating the links between the conglomerate energy of the present invention and specific energies known in the art.

The projection domain energy term can be written:

$$E_P(v, G) = \eta \int_{Projections} (P(v+G) - y)^{q1} dp$$

where η is a scalar that is used to balance the influence of this term against the other terms. In the terminology defined above for volumetric images, the fidelity term can be written:

Ep=ηF(B(x,y,z), G(x,y,z)) where η is a scalar indicating the weight on the fidelity term, and where the value of F(B(x,y,z),G(x,y,z)) is smallest where the projections of B are similar to the observed projections, pi(u,v). Note that G(x,y,z) in F(B(x,y,z),G(x,y,z)) is the volumetric image corresponding to the continuous definition of G in the analytical expressions herein.

The reconstructed volumetric image domain energy term can be written:

$$E_R(v, s, G, C) = \iint_{Regions} \chi |y - v - G|^{q2} + \alpha(1-s)^{q3} |\Omega(\nabla v, C)|^{q4} +$$
$$\beta |\Phi(v, \mu)|^{q5} + \gamma |\Psi(s, \sigma)|^{q6} + \kappa |T(\mu)|^{q7} +$$
$$\lambda |\Lambda(s)|^{q8} + \theta |M(G)|^{q9} + \varpi |A(v)|^{q10} dR$$

Where χ, α, β, γ, κ, λ, θ and ω are scalars that are used to balance the influence of this term internally as well as balance the influence of this term against the other terms. All scalars may be chosen as a function of an initial volumetric image. For instance, any one of the scalars can be set to a higher or lower value depending on the initial volumetric image Q0(x,y,z). In the terminology defined above for volumetric images, the reconstruction domain energy term can be written: Er=χR1(B(x,y,z),G(x,y,z))+αR2(s(x,y,z),B(x,y,z),C)+βR3(B(x,y,z),m)+γR4(s(x,y,z))+κR5(m)+λR6(s)+θR7(G)+ωR8(B(x,y,z)). In the definition of Er, R1 is the discrete term corresponding to the first continuous term in $E_R$(v,s,G,C), R2 to the second term, etc. The values of the individual terms, Ri(.), are each smallest where the constraints they enforce are fully satisfied. The energy term may also contain just a subset of the terms, or additional terms that aren't explicitly described here.

The boundary domain energy term can be written:

$$E_S(C) = \iint_{\substack{Tissue\\ Surface\\ Interface}} \xi |Z(C, C_\mu)|^{q11} dS$$

where ξ is a scalar that is used to balance the influence of this term against the other terms. In the terminology defined above for volumetric images, the boundary domain energy term can be written: Es=ξZ(C). In the definition of Es, Z is the discrete term corresponding to the boundary constraints in $E_s$(C). The value of the discrete boundary constraint term, Z, is smallest where the observed surface (volume boundary) models for the constituent objects in the volumetric image, B(x,y,z), match an allowable set of constituent object surface (volume boundary) models.

Given these descriptions of individual components of the energy we might like to minimize for tomosynthesis reconstruction, the overall energy of one configuration of the present invention is:

$$E = \sum_i E_i(v, s, G, C)$$

where each component energy, $E_i$, is one of the $E_P$, $E_R$, or $E_S$ described above. Likewise, for the discrete versions, E may be: sum_i Ei(B(x,y,z),G(x,y,z),s(x,y,z),C), where i is p, r, or s. In this way, any number of meaningful terms can be added to the energy functional. In one configuration, each scalar weight corresponding to each energy term may be chosen according to voxel intensity statistics of the initial volumetric image (however that initial volumetric image is reconstructed). For instance, some scalar weights may be set to zero if for some reason, that energy term is not important for this particular projection dataset. While this example of an overall energy is given in the form of a sum of separate energy terms, the energy terms may also be combined in other ways (e.g., multiplicative, in conjunction with other mappings (sigmoid), nonlinear combinations, like min/max, and combinations thereof). These terms may correspond to, for example, different observations of the same anatomy warped to compatible coordinate systems or different sets of exponents and weights on the energy functional for data from a single modality. Thus, the energy functional can have any number of terms and jointly constrain the processing on any number of imaging modalities.

Some known energy definitions are special cases of the energy functional described above. In the examples that follow, y1 is a direct observation of the volumetric image, v.

The classical Tikhonov regularization energy (A. N. Tikhonov, V. Y. Arsenin, "Solutions of Ill-posed Problems," Wiley, New York, 1977).is:

$$E(v) = \iint_{Regions} \chi |y1 - v|^2 + \alpha |v|^2 dR$$

The heat equation as minimized by Koenerdink is:

$$E(v) = \iint_{Regions} \chi |y1 - v|^2 + \alpha |\nabla v|^2 dR$$

The Total Variation-type energy as proposed in (S. Osher and L. Rudin, "Feature-oriented image enhancement using shock filters." SIAM journal of Numerical Analysis, 27(4): 919-940, August, 1990.), and subsequently as described by ([17] C. R. Vogel and M. E. Oman. Fast, robust total variation-based reconstruction of noisy, blurred images. IEEE TIP, 7(6):813-824, June 1998.) is:

$$E(v) = \iint_{Regions} \chi |y1 - v|^2 + \alpha |\nabla v|^1 dR$$

The Wells EM adaptive segmentation energy (W. M. Wells, W. E. L. Grimson, R. Kikinis, "Adaptive Segmentation of MRI data." IEEE Trans. On Med. Imag., 15(4):429-442, August 1996.) is:

$$E(v, G) = \iint_{Regions} \chi |y1 - v(y, G) - G|^2 + \theta |\nabla G|^2 dR$$

Fessler incorporates regularizers on the reconstruction domain into energies which also contain terms in the projection domain:

$$E(v) = \eta \int_{Projections} (Pv - y)^2 dp + \iint_{Regions} \chi |y1 - v|^2 + \alpha |\Omega(\nabla v)|^{q4} dR$$

The Ambrosio Tortorelli energy includes an edge field, and has appeared in a number of subsequent works (L. Ambrosio, V. M. Tortorelli, "On the approximation of free discontinuity problems," Bollettino Della Unione Matematica Italiana, 6-B:105-123, 1992, J. Shah "Segmentation by nonlinear diffusion, II." In Proc. Of the IEEE Conf. On Computer Vision and Pattern Recognition, pages 644-647, 1992, H. H. Pien, J. Gauch, "Variational segmentation of multi-channel MRI images." In IEEE Internat'l Conf. On Imag. Proc., Austin, Tex., November, 1994, and J. Kaufhold, M. Schneider, A. S. Willsky, W. C. Karl, "A Statistical Method for Efficient Segmentation of MR Imagery," International Journal of Pattern Recognition and Artificial Intelligence, Vol. 11, No. 8, pp. 1213-1231 (1997)):

$$E(v, s) = \iint_{Regions} \chi |y1 - v|^2 + \alpha(1 - s)^2 |\nabla v|^2 + \gamma |s|^2 + (1/\gamma) |\nabla s|^2 dR$$

Shah proposed a modified form of the Ambrosio Tortorelli energy whose properties are qualitatively different from the Ambrosio Tortorelli energy (J. Shah, "A common framework for curve evolution, segmentation, and anisotropic diffusion," In Proc. Of the IEEE Conf. On Computer Vision and Pattern Recognition, pages xvi+932, 136-42, 1996, J. Kaufhold, Energy Formulations of Medical Image Segmentations, Ph.D. Thesis, Boston University, Aug. 11, 2000):

$$E(v, s) = \iint_{Regions} \chi |y1 - v|^1 + \alpha(1 - s)^2 |\nabla v|^1 + \gamma |s|^2 + (1/\gamma) |\nabla s|^2 dR$$

Cetin incorporated additional terms into energies which resemble Fessler's (M. Cetin, W. C. Karl, "Feature-enhanced Synthetic Aperture Radar Image Formation Based on Nonquadratic Regularization," IEEE Trans. On Imag. Proc., Vol. 10, No. 4, April 2001):

$$E(v) = \eta \int_{Projections} (P(v) - y)^2 dp + \iint_{Regions} \alpha |\Omega(\nabla v)|^{q4} + \beta |v|^{q5} dR$$

Yezzi proposed a modified version of the Mumford-Shah functional which included imposing the closedness of the segmenting curve (A. Tsai, A. Yezzi, A. S. Willsky, "Curve Evolution Implementation of the Mumford-Shah Functional for Image Segmentation, Denoising, Interpolation, and Magnification," IEEE Trans. On Image Proc., Vol 10, No. 8, August 2001). $\Omega(x,C)$ in this case is zero where the local region (x is a gradient defined across pixels, e.g.) crosses C and x otherwise. Z(x) is the length of the curve (or surface area for a surface boundary) of the curve (or surface), x.

$$E(v, C) = \iint_{Regions} \chi |y1 - v|^{q2} + \alpha |\Omega(\nabla v, C)|^{q4} \, dR +$$

$$\xi \iint_{\substack{Tissue \\ Surface \\ Interface}} |Z(C)|^{q11} \, dS$$

Because the functionals of some configurations of the present invention are more complex than any of its components, except under special circumstances, no one known approach for minimization of a given subenergy will produce even a local minimum of the energy defined. Thus, various configurations of the present invention utilize new minimization approaches as well as ad-hoc hybrid minimization methods that comprise a combination of a plurality of minimization algorithms known in the art to minimize component energies or groups of energy terms.

Coordinatewise Conglomerate Energy Reduction: To convey an understanding of our approach to minimizing the conglomerate energy, we define some concepts. First, "conglomerate energy input fields" refers to the collection of all fields, etc., that are arguments of (input fields of) the conglomerate energy. Second, a "subenergy" is any energy definition comprising a collection of at least one, but not all, of the energy terms in the conglomerate energy. The subenergy in some configurations depends on only a subset of all the fields and/or hypersurfaces in the conglomerate energy. The term "input fields" describes the set of all fields, hypersurfaces, etc., that can reduce the energy. The input fields of the subenergy that are modified are called "variable input fields" and the input fields that are held constant are called "fixed input fields". A "coordinatewise reduction" as used herein describes a reduction in the value of a subenergy due to modifications made to the variable input fields. A coordinatewise minimum is not necessary to achieve a coordinatewise reduction, but a coordinatewise minimum is the lowest coordinatewise reduction that can be achieved. The "marginal subenergy reduction" is the difference between the subenergy value for the set of input fields at the beginning of the coordinatewise reduction and the subenergy value for the set of input fields (of which the variable fields may have changed) at the end of the coordinatewise reduction. A "subenergy minimization method" as used herein is any method that can be used to choose a new set of input fields for a given subenergy such that there is a marginal subenergy reduction; for instance, any reconstruction algorithm defined above may be used to minimize a subenergy. An "artifact removal operation" (which may or may not depend on the energy or subenergy definition, explicitly) as used herein is a process by which artifacts in the updated fields may be eliminated or mitigated. The artifact removal process, for instance, may alter fields such that nonphysical estimates of fields are disallowed (for example, attenuation coefficient values in a part of the volumetric image known to be air should not contain attenuation coefficients corresponding to tissue).

In at least one configuration of the present invention, minimization of the conglomerate energy is performed via a coordinatewise energy reduction. In coordinatewise energy reduction, all conglomerate energy input fields are initialized with some reasonable estimates of their field values using available techniques. For instance, in one configuration of the present invention, the volumetric image, v, is initialized with the generalized filtered backprojection solution using only the projection data. A first subenergy is defined and reduced coordinatewise in its variable input fields using a subenergy reduction method (which may be tailored to reducing that specific subenergy). After subenergy reduction, the conglomerate energy input fields corresponding to the variable input fields of the subenergy are updated with the field values of the subenergy variable input fields at the final step of subenergy reduction. This update may be followed by an artifact removal operation (which may not be based on the energy formulation, specifically) in which the conglomerate energy input fields are updated with the output of the artifact removal operation. Then a second subenergy is defined and reduced in a similar coordinatewise fashion, followed by an update of conglomerate energy input fields as was done in the update step for the first subenergy. This may then be followed by another artifact removal operation. This process may be repeated for any number of subenergy definitions. In this way, each subenergy reduction following each subenergy definition reduces the conglomerate energy. Note that such configurations of the present invention differ from known subenergy minimization methods because they are configured to minimize a broader class of energies than any individual energy.

Alternating Compromising Minimization Strategy: In many known energy definitions, the aim is to arrive at a mathematical reduction of the image processing problem corresponding roughly to a unique parameterization of the problem. At least some known methods to achieve this goal remove terms or parts of terms from a more complex energy functional so that minimizing individual subenergies are in some sense noninteracting (less redundant). By contrast, in configurations of the present invention utilizing the conglomerate energy definition above, the goal is opposite. More particularly, the energy functional is allowed some degree of complexity and redundancy, but a goal is for it to be a complete description of the field properties to be imbued on the input fields. That is, the terms become more redundant as additional terms are added. This redundancy leads to complex (and potentially slow) minimization strategies for individual subenergies containing two significantly redundant terms. For instance, in a subenergy containing both an edge field constraint and a boundary constraint, the locus of points in the edge strength field, s, with values near 1 should be close (in a Hausdorff metric sense, for example) to the boundary contour, C. In minimizing a subenergy with these two terms it may be advantageous to split the subenergy further into two sub-subenergies, each of which is minimized independently. The resulting field values for the boundary fields, s, and C, can then be "fused" in a compromise procedure. Various configurations of the present invention thus compromise between conflicting conglomerate input field values.

Known methods for minimizing specific energy functionals include gradient descent, level set methods, coordinate descent, linear programming, Karmarkar's method, DFGS, half-quadratic minimization, and minimization by convolution. However, configurations of the present invention apply these approaches to newer and more extensive energy functional definitions. Specifically, although known methods apply a minimization technique to a specific energy, it is not part of a minimization technique of a larger more complex energy definition. However, some configurations of the present invention apply known minimization algorithms to such larger and more complex energy definitions.

For example, in a chest imaging application, at least one configuration of the present invention utilizes a model for voxel intensities to constrain reconstructed volumetric images, and utilizes the reconstruction to further refine the model. The energy utilized in this configuration also included a term penalizing the derivative of the field.

It will be appreciated that configurations of the present invention are able to provide volumetric images that comprise three-dimensional localized quantitative tissue characteristics and classification in addition to qualitative information about three-dimensional location, shape, and extent of structures provided by tomosynthesis.

Quantitative information incorporated into three-dimensional volumetric images in various configurations of the present invention adds significant diagnostic value to a reconstructed volumetric image while also providing collateral constraints to aid in management of reconstruction artifacts. Furthermore, in some medical applications, the reconstructed three-dimensional volumetric image of an imaged breast or other structure can be expressed in terms of its constituent material classes or tissue types. As a result, reconstructed volumetric images are completely independent of the technique used to acquire the corresponding tomosynthesis projection dataset. X-ray technique-independent volumetric images can be used for making comparisons between volumetric images reconstructed from datasets acquired on different dates, for example.

The present invention is not limited to configurations involving breast image reconstruction or even to medical applications, but rather can be used for quantitative reconstruction of an image of any object that is hypothesized to have a limited number of constituent compositions.

While the invention has been described in terms of various specific embodiments, those skilled in the art will recognize that the invention can be practiced with modification within the spirit and scope of the claims.

What is claimed is:

1. A method for reconstructing a volumetric image of an object comprising:
obtaining a tomosynthesis projection dataset of an object; and
utilizing the tomosynthesis projection dataset and additional information about the object, minimizing a selected energy function or functions to at least one of satisfy or arbitrate among a selected set of constraints to obtain a 3D volumetric image representative of the imaged object in which each voxel in the volumetric image corresponds to a single one component material class.

2. A method in accordance with claim 1 wherein the volumetric image is an N-ary volumetric image, and the selected energy function or functions comprises an energy functional which relates the N-ary volumetric image to a volumetric image of the object obtained by utilizing a different imaging modality.

3. A method in accordance with claim 1 wherein the object is an anatomical object, and the energy functional includes a shape energy term in which the N-ary volumetric image is constrained to contain material class anatomy shapes that are similar to a real anatomy.

4. A method in accordance with claim 3 wherein the material class anatomy shapes include ligaments and glands.

5. A method in accordance with claim 3 wherein the shape energy term penalizes a three dimensional morphology of the N-ary volumetric reconstruction.

6. A method in accordance with claim 1 wherein, for isolated voxels of a single material class surrounded by a plurality of other voxel labels, the isolated voxel is set to one of the surrounding labels.

7. A method in accordance with claim 1 wherein the energy functional is an overall conglomerate functional that has properties that are a function of a plurality of specific energy definitions.

8. A method in accordance with claim 1 wherein at least one of said specific energy definitions may be bounded by a maximum value.

9. A method in accordance with claim 1 further comprising setting at least one of said specific energy definitions to zero when it may be less than a tolerance value.

10. A method in accordance with claim 1 wherein said energy functional comprises a plurality of terms selected from the group consisting of a projection domain fidelity constraint, a reconstructed volumetric image domain fidelity constraint, an edge-preserving smoothness constraint, an intensity model constraint, a boundary field model constraint, an intensity model probability constraint, a boundary field model probability constraint, a bias field constraint, an artifact minimizing constraint, a boundary property constraint, and combinations thereof.

11. A method in accordance with claim 10, wherein said energy functional comprises a projection domain fidelity constraint having an energy term to quantify reprojection consistency written as:

$$\int_{Projections} (P(v+G) - y)^{q1} \, dp$$

where P(v+G) is the projection of the sum of the reconstructed volumetric image, v, and an artifact field, G, into the same space as the acquired projection images, y, and q1 is a scalar exponent.

12. A method in accordance with claim 10, wherein said energy functional comprises a projection domain fidelity constraint written as:

$$\int_{Projections} T(v, G, y) \, dp$$

where T is a penalty on some metric which differentiates the observed projections, y, from the expected projections from the joint estimate of v and G, where v is the reconstructed volumetric image, and G is an artifact field.

13. A method in accordance with claim 10, wherein said energy functional comprises a reconstructed volumetric image domain fidelity constraint written as:

$$\int\int_{Regions}\int |y_R - (v+G)|^{q2} \, dR$$

wherein $y_R$ is an observation in the reconstructed volumetric image domain, v is the reconstructed volumetric image, G is an artifact field, and q2 is a scalar exponent.

14. A method in accordance with claim 13 wherein yR is a min norm least squares solution of observed projections through projection operator P.

15. A method in accordance with claim 13 wherein said energy functional further penalizes deviations from reconstructed volumetric images from previous years or from other modalities.

16. A method in accordance with claim 10, wherein said energy functional comprises an edge-preserving smoothness constraint locally penalizing a derivative of an intensity value.

17. A method in accordance with claim 10, wherein said energy functional comprises an edge preserving smoothness constraint combining smoothing and edge preservation.

18. A method in accordance with claim 10, wherein said energy functional comprises an edge-preserving smoothness constraint written as:

$$\iint_{Regions} (1-s)^{q3} |\Omega(\nabla v, C)|^{q4} dR$$

where s is an edge strength field between 0 and 1 (s~0 being smooth and s~1 being an edge), q3 is a scalar exponent, $\Omega(x,y)$ is a weighting function on the local field x, conditioned on a curve in space, y, and $\nabla v$ is the gradient of v, which itself is the reconstructed volumetric image, and q4 is a scalar exponent.

19. A method in accordance with claim 10, wherein said energy functional comprises an intensity model constraint penalizing any value in the reconstructed volumetric image that does not lie in a physically possible or probable range.

20. A method in accordance with claim 10, wherein said energy functional comprises an intensity model constraint utilizing the fact that linear attenuation coefficients for different locations within a reconstructed volumetric image are distinct, not mixed.

21. A method in accordance with claim 20 further comprising utilizing said intensity model constraint in combination with a prior model in which certain material classes are likely to be present.

22. A method in accordance with claim 10, wherein said energy functional comprises an intensity model constraint that penalizes large deviations from specific intensity levels, said intensity model constraint written as:

$$\iint_{Regions} |\Phi(v, \mu)|^{q5} dR$$

where $\Phi(v, \mu)$ is a function that takes the reconstructed volumetric image, v, into the intensity model domain, $\mu$, so that it may be compared to v, where $\mu$ is a prior model of expected intensities in v, v is the reconstructed volumetric image, $\mu$ is the spatially dependent intensity model, and q5 is a scalar exponent.

23. A method in accordance with claim 22, wherein, for a voxel at a given location coming from one of two different tissue classes, with means m1 and m2, respectively, the contribution to the energy functional at the given voxel location is larger for voxel intensity values at that location that are further from m1 or m2 compared to the contribution to the energy functional at that voxel if its intensity were closer to m1 or m2.

24. A method in accordance with claim 10 wherein said energy functional comprises a structural shape constraint that penalizes material class shapes that deviate significantly from expected physical shape characteristics of structures in the real anatomy.

25. A method in accordance with claim 24 used to reconstruct a volume of a breast, wherein $\mu$ describes a breast composed of a plurality of structures embedded in a volume of otherwise fatty-equivalent tissue.

26. A method in accordance with claim 25 wherein the structures comprise the group consisting of fibrous structures, glands, Cooper's ligaments, microcalcifications, fibroadenomas, architectural distortion, and combinations thereof.

27. A method in accordance with claim 10, wherein said energy functional comprises a boundary field model constraint to constrain properties of an edge field.

28. A method in accordance with claim 27 wherein said boundary field model constraint comprises an energy model written as:

$$\iint_{Regions} |\Psi(s, \sigma)|^{q6} dR$$

where $\Psi(s,\sigma)$ is a function that takes an estimated edge field, s, into the boundary model domain, $\sigma$, so that it may be compared directly to $\sigma$, s is the edge strength field, and $\sigma$ is a prior model of expected boundary properties, and q6 is a scalar exponent.

29. A method in accordance with claim 10 wherein said energy functional comprises an intensity model probability constraint.

30. A method in accordance with claim 29 wherein said intensity model probability constraint comprises an energy term written as:

$$\iint_{Regions} |T(\mu)|^{q7} dR$$

where $T(\mu)$ is a function that is large for unlikely models, $\mu$, and smaller for more likely models, $\mu$, $\mu$ is the spatially dependent prior model on intensities of v, and q7 is a scalar exponent.

31. A method in accordance with claim 30 wherein $\mu$ depends upon a volumetric image obtained with another modality.

32. A method in accordance with claim 30 wherein $\mu$ depends upon a high-level representation of the volumetric image v.

33. A method in accordance with claim 32 wherein a high level representation of v comprises a convex hull.

34. A method in accordance with claim 32 wherein a high level representation of v includes an integral measure of squared intensity in a background of the image.

35. A method in accordance with claim 10 wherein said energy functional comprises a boundary field model probability constraint that constrains a prior model of an edge strength function.

36. A method in accordance with claim 35 wherein when it is known a priori that an edge is less likely to develop a prior model of the edge strength function that allowed the edge strength function to develop large edge strength values in a region of an image is penalized more than a prior model of the edge strength function that did not allow the edge strength function to develop edges in those regions.

37. A method in accordance with claim 35 wherein the boundary field model probability constraint comprises an energy function written as:

$$\iint_{Regions} |\Lambda(\sigma)|^{q8} \, dR$$

where $\Lambda(\sigma)$ is a function that is large for unlikely boundary field models, $\sigma$, and smaller for more likely boundary field models, $\sigma$, and q8 is a scalar exponent.

38. A method in accordance with claim 10 wherein said energy functional comprises a bias field constraint configured to source separate an artifact volumetric image from a real attenuation coefficient volumetric image.

39. A method in accordance with claim 38 wherein said bias field constraint comprises an energy function written as:

$$\iint_{Regions} |M(G)|^{q9} \, dR$$

M(G) is a function that is large for both unlikely artifact volumetric images, G, and for artifact volumetric images, G, that resemble true tissue structure, G is the artifact field, and q9 is a scalar exponent.

40. A method in accordance with claim 39 wherein M(G) is a measure of high frequency energy in G.

41. A method in accordance with claim 10 wherein said energy functional comprises an artifact minimizing constraint energy function.

42. A method in accordance with claim 41 wherein said artifact minimizing constraint energy function comprises an energy function written as:

$$\iint_{Regions} |A(v)|^{q10} \, dR$$

where $A(v)$ is a measure of the artifacts in v, v is the reconstructed volumetric image, and q10 is a scalar exponent.

43. A method in accordance with claim 42 wherein $A(v)$ is large for reconstructions where copies of high-contrast structures are spread into adjacent planes of the reconstructed volumetric image, and smaller for reconstructed volumetric images where such an artifact is reduced.

44. A method in accordance with claim 10 wherein said energy functional comprises a boundary property constraint.

45. A method in accordance with claim 44 further comprising evolving a closed n-1 dimensional hypersurface embedded in an n-dimensional field under influence of an edge strength function and a curvature-dependent bending force, reaching an equilibrium of the hypersurface, and taking the equilibrium hypersurface as a boundary separating different material classes.

46. A method in accordance with claim 45 further incorporating an influence of a prior model on the hypersurface into the energy utilizing an energy function written as:

$$\iint_{\substack{Tissue\ Surface \\ Interface\ Properties}} |Z(C, C_\mu)|^{q11} \, dS$$

where $Z(C, C_\mu)$ is a function that measures a number of properties of the curve or surface, C, and computes some distance to another curve or surface, $C_\mu$; C is the curve or surface in space, $C_\mu$ is the model for the given material class surface interface and q11 is a scalar exponent.

47. A method in accordance with claim 46 wherein said distance to another curve or surface is selected from the group consisting of diffeomorphism, Hausdorff metric, and weighted parameter difference.

48. A method in accordance with claim 10 wherein said energy functional comprises an overall energy written as:

$$E = \sum_i E_i(v, s, G, C)$$

where each component energy, Ei, is one of $$E_P(v, G) = \eta \int_{Projections} (P(v+G) - y)^{q1} \, dp$$

where $\eta$ is a scalar to balance the influence of this term against other terms, $$E_R(v, s, G, C) = \iint_{Regions} \chi \, |y - v - G|^{q2} + \alpha(1-s)^{q3} \, |\Omega(\nabla v, C)|^{q4} +$$
$$\beta |\Phi(v, \mu)|^{q5} + \gamma |\Psi(s, \sigma)|^{q6} + \kappa |T(\mu)|^{q7} +$$
$$\lambda |\Lambda(s)|^{q8} + \theta |M(G)|^{q9} + \varpi |A(v)|^{q10} \, dR$$

where $\chi, \alpha, \beta, \gamma, \kappa, \lambda, \theta$, and $\omega$ are scalars that are used to balance the influence of this term internally as well as balance the influence of this term against other terms, and $$E_S(C) = \iint_{\substack{Tissue \\ Surface \\ Interface}} \xi \, |Z(C, C_\mu)|^{q11} \, dS$$

where $\xi$ is a scalar that is used to balance the influence of this term against the other terms.

49. A method in accordance with claim 48 wherein at least one scalar weight is chosen based on an initial volumetric image, Q0(x,y,z).

50. A method in accordance with claim 10 wherein said energy functional comprises an overall energy combined as at least one of a sum of separate energy terms, a multiplication of separate energy terms, in conjunction with other mappings (sigmoid), nonlinear combinations, min/max, and combinations thereof.

51. A method for reconstructing a volumetric image of an object, said method comprising:
acquiring a tomosynthesis projection dataset of an object;

preprocessing the projections to produce quantitative projections;

performing an initial reconstruction using the quantitative projections; and choosing an energy definition to minimize, wherein the energy definition includes a term that constrains the reconstructed volumetric image to an N-ary or approximately N-ary composition of material classes.

52. A method in accordance with claim 51 further comprising performing an energy minimizing reconstruction utilizing the chosen energy definition to produce the volumetric image of the object.

53. A method in accordance with claim 52 wherein said preprocessing comprises at least one step selected from the group consisting of bad pixel correction, gain correction, scatter correction, a correction to remap intensities to reflect a quantitative measure of material class, and combinations thereof.

54. A method in accordance with claim 52 further comprising selecting parameters associated with the energy definition selection.

55. A method in accordance with claim 52 wherein the object is a breast.

56. A method in accordance with claim 52 wherein said preprocessing the projections to produce quantitative projections further comprises performing a scatter correction.

57. A method in accordance with claim 52 wherein the object is a breast, and said preprocessing the projections to produce quantitative projections further comprises utilizing calibration curves to produce the quantitative projections.

58. A method in accordance with claim 52 wherein the object is a breast, and said preprocessing the projections to produce quantitative projections further comprises determining at least one of an average percent glandular tissue for one or more projection images and an average percent glandular tissue over all projections.

59. A method in accordance with claim 52 wherein the object is a breast having a volume B, and wherein said performing an initial reconstruction comprises performing a filtered backprojection.

60. A method in accordance with claim 52 wherein said preprocessing the projections to produce quantitative projections further comprises at least one member of the group consisting of determining a line integral of an attenuation coefficient and determining a material class composition along a ray.

61. A method in accordance with claim 52 wherein an energy used in said energy minimization is selected to manage a plurality of constraints.

62. A method in accordance with claim 52 wherein an energy used in said energy minimization is selected to manage a plurality of objectives, including at least one objective selected from the list consisting of artifact rejection, strictly N-ary volumetric image, approximately N-ary volumetric image, and reprojection consistency.

63. A method in accordance with claim 52 further comprising utilizing prior knowledge of the object in said reconstruction so that said reconstructed volumetric image is essentially N-ary and each voxel thereof quantitatively reflects an actual material class of the object.

64. A method in accordance with claim 63 wherein the object is a breast, and said prior knowledge comprises an anatomy of the breast and x-ray properties of the breast.

65. An apparatus for producing a reconstructed volumetric image of an object, said apparatus comprising a radiation source, a detector, an image processor and a computer, wherein said image processor is not necessarily a separate component from said computer, said apparatus configured to:

obtain a tomosynthesis projection dataset of an object; and utilize the tomosynthesis projection dataset and additional information about the object to minimize a selected energy function or functions to at least one of satisfy or arbitrate among a selected set of constraints to obtain a volumetric image in which each voxel is assigned a specific component material class.

66. An apparatus in accordance with claim 65 wherein the volumetric image is an N-ary volumetric image, and the selected energy function or functions comprises an energy functional which relates the N-ary volumetric to a volumetric image of the object obtained by utilizing a different imaging modality.

67. An apparatus in accordance with claim 66 wherein the object is an anatomical object, and the energy functional includes a shape energy term in which the N-ary volumetric image is constrained to contain material class anatomy shapes that are similar to a real anatomy.

68. An apparatus in accordance with claim 67 wherein the material class anatomy shapes include ligaments and glands.

69. An apparatus in accordance with claim 67 wherein the shape energy term penalizes a three dimensional morphology of the N-ary volumetric reconstruction.

70. An apparatus in accordance with claim 66 wherein, for isolated voxels of a single material class surrounded by a plurality of other voxel labels, the isolated voxel is set to one of the surrounding labels.

71. An apparatus in accordance with claim 66 wherein the energy functional is an overall conglomerate functional that has properties that are a function of a plurality of specific energy definitions.

72. An apparatus in accordance with claim 71 wherein at least one of said specific energy definitions may be bounded by a maximum value.

73. An apparatus in accordance with claim 71 further configured to set at least one of said specific energy definitions to zero when it may be less than a tolerance value.

74. An apparatus in accordance with claim 66 wherein said energy functional comprises a plurality of terms selected from the group consisting of a projection domain fidelity constraint, a reconstructed volumetric image domain fidelity constraint, an edge-preserving smoothness constraint, an intensity model constraint, a boundary field model constraint, an intensity model probability constraint, a boundary field model probability constraint, a bias field constraint, an artifact minimizing constraint, a boundary property constraint, and combinations thereof.

75. An apparatus in accordance with claim 74, wherein said energy functional comprises a projection domain fidelity constraint having an energy term to quantify reprojection consistency written as:

$$\int_{Projections} (P(v+G)-y)^{q1} \, dp$$

where $P(v+G)$ is the projection of the sum of the reconstructed volumetric image, $v$, and an artifact field, $G$, into the same space as the acquired projection images, $y$, and $q1$ is a scalar exponent.

76. An apparatus in accordance with claim 74, wherein said energy functional comprises a projection domain fidelity constraint written as:

$$\int_{Projections} T(v, G, y)\, dp$$

where T is a penalty on some metric which differentiates the observed projections, y, from the expected projections from the joint estimate of v and G, where v is the reconstructed volumetric image, and G is an artifact field.

77. An apparatus in accordance with claim 74, wherein said energy functional comprises a reconstructed volumetric image domain fidelity constraint written as:

$$\iint_{Regions} \chi\, |y_R - (v + G)|^{q2}\, dR$$

wherein yR is an observation in the reconstructed volumetric image domain, v is the reconstructed volumetric image, G is an artifact field, and q2 is a scalar exponent.

78. An apparatus in accordance with claim 77 wherein yR is a min norm least squares solution of observed projections through projection operator P.

79. An apparatus in accordance with claim 77 wherein said energy functional further penalizes deviations from reconstructed volumetric images from previous years or from other modalities.

80. An apparatus in accordance with claim 74, wherein said energy functional comprises an edge-preserving smoothness constraint locally penalizing a derivative of an intensity value.

81. An apparatus in accordance with claim 74, wherein said energy functional comprises an edge preserving smoothness constraint combining smoothing and edge preservation.

82. An apparatus in accordance with claim 74, wherein said energy functional comprises an edge-preserving smoothness constraint written as:

$$\iint_{Regions} (1-s)^{q3}\, |\Omega(\nabla v, C)|^{q4}\, dR$$

where s is an edge strength field between 0 and 1 (s~0 being smooth and s~1 being an edge), q3 is a scalar exponent, $\Omega(x,y)$ is a weighting function on the local field x, conditioned on a curve in space, y, and $\nabla v$ is the gradient of v, which itself is the reconstructed volumetric image, and q4 is a scalar exponent.

83. An apparatus in accordance with claim 74, wherein said energy functional comprises an intensity model constraint penalizing any value in the reconstructed volumetric image that does not lie in a physically possible or probable range.

84. An apparatus in accordance with claim 74, wherein said energy functional comprises an intensity model constraint utilizing the fact that linear attenuation coefficients for different locations within a reconstructed volumetric image are distinct, not mixed.

85. An apparatus in accordance with claim 84 further configured to utilize said intensity model constraint in combination with a prior model in which certain material classes are likely to be present.

86. An apparatus in accordance with claim 74, wherein said energy functional comprises an intensity model constraint that penalizes large deviations from specific intensity levels, said intensity model constraint written as:

$$\iint_{Regions} |\Phi(v, \mu)|^{q5}\, dR$$

where $\Phi(v, \mu)$ is a function that takes the reconstructed volumetric image, v, into the intensity model domain, $\mu$, so that it may be compared to v, where $\mu$ is a prior model of expected intensities in v, v is the reconstructed volumetric image, $\mu$ is the spatially dependent intensity model, and q5 is a scalar exponent.

87. An apparatus in accordance with claim 86, wherein, for a voxel at a given location coming from one of two different tissue classes, with means m1 and m2, respectively, the contribution to the energy functional at the given voxel location is larger for voxel intensity values at that location that are further from m1 or m2 compared to the contribution to the energy functional at that voxel if its intensity were closer to m1 or m2.

88. An apparatus in accordance with claim 74 wherein said energy functional comprises a structural shape constraint that penalizes material class shapes that deviate significantly from expected physical shape characteristics of structures in the real anatomy.

89. An apparatus in accordance with claim 88 used to reconstruct a volume of a breast, wherein $\mu$ describes a breast composed of a plurality of structures embedded in a volume of otherwise fatty-equivalent tissue.

90. An apparatus in accordance with claim 89 wherein the structures comprise the group consisting of fibrous structures, glands, Coopers's ligaments, microcalcifications, fibroadenomas, architectural distortion, and combinations thereof.

91. An apparatus in accordance with claim 74, wherein said energy functional comprises a boundary field model constraint to constrain properties of an edge field.

92. An apparatus in accordance with claim 91 wherein said boundary field model constraint comprises an energy model written as:

$$\iint_{Regions} |\Psi(s, \sigma)|^{q6}\, dR$$

where $\Psi(s,\sigma)$ is a function that takes an estimated edge field, s, into the boundary model domain, $\sigma$, so that it may be compared directly to $\sigma$, s is the edge strength field, and $\sigma$ is a prior model of expected boundary properties, and q6 is a scalar exponent.

93. An apparatus in accordance with claim 74, wherein said energy functional comprises an intensity model probability constraint.

94. An apparatus in accordance with claim 93 wherein said intensity model probability constraint comprises an energy term written as:

$$\iint_{Regions} |T(\mu)|^{q7}\, dR$$

where $T(\mu)$ is a function that is large for unlikely models, $\mu$, and smaller for more likely models, $\mu$, $\mu$ is the spatially dependent prior model on intensities of v, and q7 is a scalar exponent.

95. An apparatus in accordance with claim 94 wherein µ depends upon a volumetric image obtained with another modality.

96. An apparatus in accordance with claim 94 wherein µ depends upon a high-level representation of the volumetric image v.

97. An apparatus in accordance with claim 96 wherein a high level representation of v comprises a convex hull.

98. An apparatus in accordance with claim 96 wherein a high level representation of v includes an integral measure of squared intensity in a background of the image.

99. An apparatus in accordance with claim 74, wherein said energy functional comprises a boundary field model probability constraint that constrains a prior model of an edge strength function.

100. An apparatus in accordance with claim 99 wherein when it is known a priori that an edge is less likely to develop a prior model of the edge strength function that allowed the edge strength function to develop large edge strength values in a region of an image is penalized more than a prior model of the edge strength function that did not allow the edge strength function to develop edges in those regions.

101. An apparatus in accordance with claim 99 wherein the boundary field model probability constraint comprises an energy function written as:

$$\iint_{Regions} |\Lambda(\sigma)|^{q8} \, dR$$

where $\Lambda(\sigma)$ is a function that is large for unlikely boundary field models, $\sigma$ and smaller for more likely boundary field models, $\sigma$, $\sigma$ is the boundary field, and q8 is a scalar exponent.

102. An apparatus in accordance with claim 74, wherein said energy functional comprises a bias field constraint configured to source separate an artifact volumetric image from a real attenuation coefficient volumetric image.

103. An apparatus in accordance with claim 102 wherein said bias field constraint comprises an energy function written as:

$$\iint_{Regions} |M(G)|^{q9} \, dR$$

M(G) is a function that is large for both unlikely artifact volumetric images, G, and for artifact volumetric images, G, that resemble true tissue structure, G is the artifact field, and q9 is a scalar exponent.

104. An apparatus in accordance with claim 103 wherein M(G) is a measure of high frequency energy in G.

105. An apparatus in accordance with claim 74, wherein said energy functional comprises an artifact minimizing constraint energy function.

106. An apparatus in accordance with claim 105 wherein said artifact minimizing constraint energy function comprises an energy function written as:

$$\iint_{Regions} |A(v)|^{q10} \, dR$$

where A(v) is a measure of the artifacts in v, v is the reconstructed volumetric image, and q10 is a scalar exponent.

107. An apparatus in accordance with claim 106 wherein A(v) is large for reconstructions where copies of the high-contrast structures are spread into adjacent planes of the reconstructed volumetric image, and smaller for reconstructed volumetric images where such an artifact is reduced.

108. An apparatus in accordance with claim 74, wherein said energy functional comprises a boundary property constraint.

109. An apparatus in accordance with claim 108 further configured to evolve a closed n-1 dimensional hypersurface embedded in an n-dimensional field under influence of an edge strength function and a curvature-dependent bending force, reach an equilibrium of the hypersurface, and take the equilibrium hypersurface as a boundary separating different material classes.

110. An apparatus in accordance with claim 109 further incorporating an influence of a prior model on the hypersurface into the energy utilizing an energy function written as:

$$\iint_{\substack{Tissue\ Surface \\ Interface\ Properties}} |Z(C, C_\mu)|^{q11} \, dS$$

where $Z(C, C_\mu)$ is a function that measures a number of properties of the curve or surface, C, and computes some distance to another curve or surface, $C_\mu$; C is the curve or surface in space, $C_\mu$ is the model for the given material class surface interface and q11 is a scalar exponent.

111. An apparatus in accordance with claim 110 wherein said distance to another curve or surface is selected from the group consisting of diffeomorphism, Hausdorff metric, and weighted parameter difference.

112. An apparatus in accordance with claim 74, wherein said energy functional comprises an overall energy written as:

$$E = \sum_i E_i(v, s, G, C)$$

where each component energy, Ei, is one of $$E_P(v, G) = \eta \int_{Projections} (P(v+G) - y)^{q1} \, dp$$

where $\eta$ is a scalar to balance the influence of this term against other terms, $$E_R(v, s, G, C) = \iint_{Regions} \chi|y - v - G|^{q2} + \alpha(1-s)^{q3} |\Omega(\nabla v, C)|^{q4} +$$
$$\beta |\Phi(v, \mu)|^{q5} + \gamma |\Psi(s, \sigma)|^{q6} + \kappa |T(\mu)|^{q7} +$$
$$\lambda |\Lambda(s)|^{q8} + \theta |M(G)|^{q9} + \varpi |A(v)|^{q10} \, dR$$

where $\chi$, $\alpha$, $\beta$, $\gamma$, $\kappa$, $\lambda$, $\theta$, and $\omega$ are scalars that are used to balance the influence of this term internally as well as balance the influence of this term against other terms, and $$E_S(C) = \iint_{\substack{Tissue \\ Surface \\ Interface}} \xi |Z(C, C_\mu)|^{q^{11}} dS$$

where $\xi$ is a scalar that is used to balance the influence of this term against the other terms.

113. An apparatus in accordance with claim 74, wherein said energy functional comprises an overall energy combined as at least one of a sum of separate energy terms, a multiplication of separate energy terms, in conjunction with other mappings (sigmoid), nonlinear combinations, min/max, and combinations thereof.

114. An apparatus for producing a reconstructed volumetric image of an object, said apparatus comprising a radiation source, a detector, an image processor and a computer, wherein said image processor is not necessarily a separate component from said computer, said apparatus configured to:
acquire projections of an object;
preprocess the projections to produce quantitative projections;
perform an initial reconstruction using the quantitative projections; and
choose an energy definition to minimize, wherein the energy definition includes a term that constrains the reconstructed volume to an N-ary or approximately N-ary composition of material classes.

115. An apparatus in accordance with claim 114 further configured to perform an energy minimizing reconstruction utilizing the chosen energy definition to produce the volumetric image of the object.

116. An apparatus in accordance with claim 115 wherein said preprocessing comprises at least one process selected from the group consisting of bad pixel correction, gain correction, scatter correction, a correction to remap intensities to reflect a quantitative measure of material class, and combinations thereof.

117. An apparatus in accordance with claim 115 further configured to select parameters for associated with the energy definition selection.

118. An apparatus in accordance with claim 115 configured to acquire projections of a breast.

119. An apparatus in accordance with claim 115 wherein to preprocess the projections to produce quantitative projections, said apparatus is further configured to perform a scatter correction.

120. An apparatus in accordance with claim 115 configured to acquire projections of a breast, and to preprocess the projections to produce quantitative projections, said apparatus is further configured to utilize calibration curves to produce the quantitative projections.

121. An apparatus in accordance with claim 115 configured to acquire projections of a breast, and to preprocess the projections to produce quantitative projections, said apparatus is further configured to determine an average percent glandular tissue for each projection and an average percent glandular tissue over all projections.

122. An apparatus in accordance with claim 115 configured to acquire projections of a breast having a volume B, and wherein said the reconstruction comprises a filtered backprojection.

123. An apparatus in accordance with claim 115 wherein to preprocess the projections to produce quantitative projections said apparatus is further configured to perform at least one member of the group consisting of determining a line integral of an attenuation coefficient and a material class composition along a ray.

124. An apparatus in accordance with claim 115 wherein an energy used in said energy minimization is selected to manage a minimization of a plurality of constraints.

125. An apparatus in accordance with claim 115 wherein an energy used in said energy minimization is selected to manage a plurality of objectives, including at least one objective selected from the list consisting of artifact rejection, approximately N-ary tissue reconstruction, and reprojection consistency.

126. An apparatus in accordance with claim 115 further configured to utilize prior knowledge of the object in said reconstruction so that said reconstruction is essentially N-ary and quantitatively reflects an actual material class of the object.

127. An apparatus in accordance with claim 126 configured to reconstruct an image of a breast, and said prior knowledge comprises an anatomy of the breast and x-ray properties of the breast.

* * * * *

UNITED STATES PATENT AND TRADEMARK OFFICE
CERTIFICATE OF CORRECTION

PATENT NO. : 7,653,229 B2  Page 1 of 1
APPLICATION NO. : 10/744882
DATED : January 26, 2010
INVENTOR(S) : Kaufhold et al.

Figure 4:
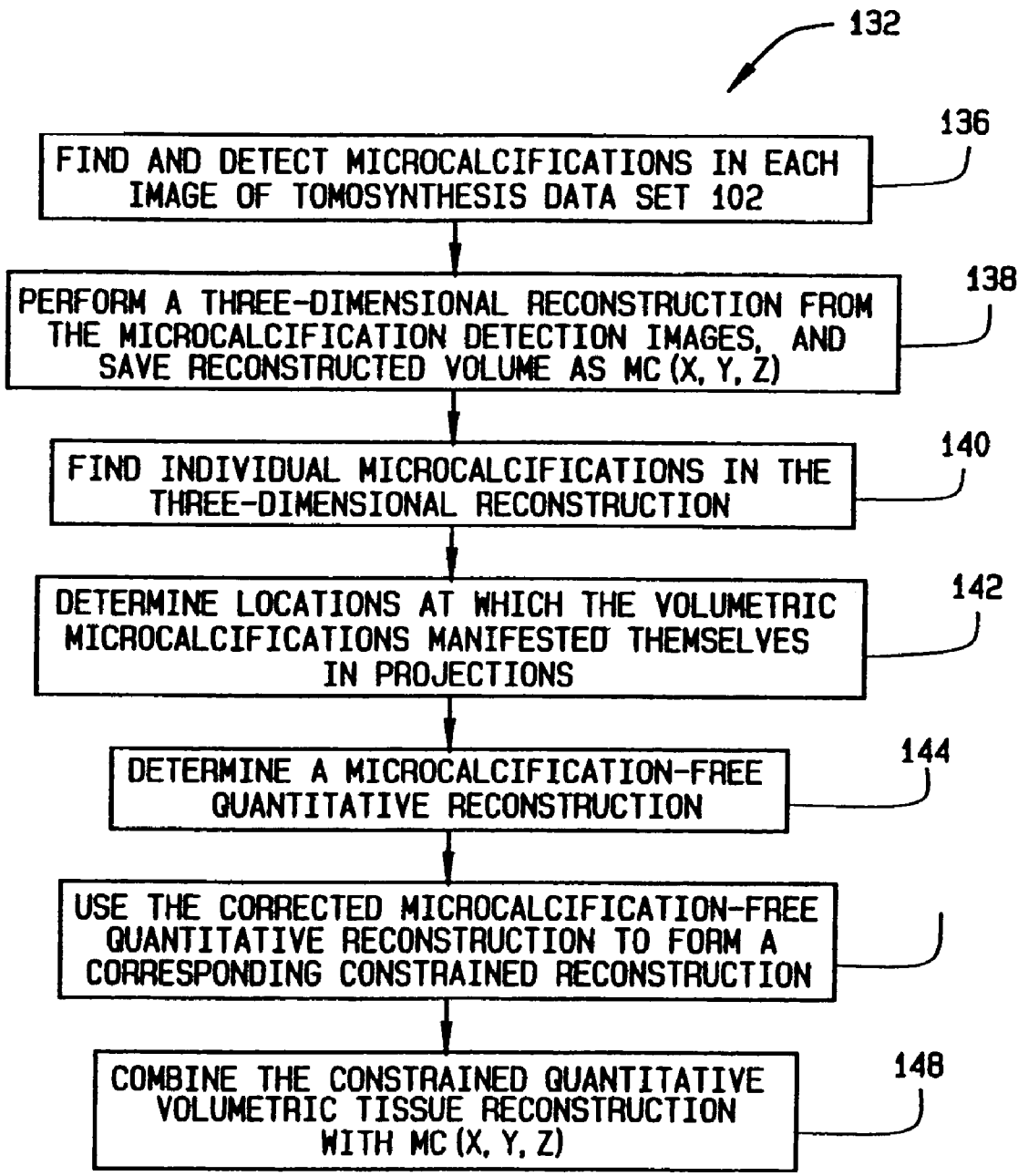
FIG. 4 is a flowchart illustrating a configuration of the present invention useful for quantitative tissue reconstructions.

It is certified that error appears in the above-identified patent and that said Letters Patent is hereby corrected as shown below:

In Fig. 4, Sheet 3 of 6, between Tags "144 and 148", delete " 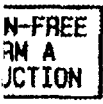 " and insert 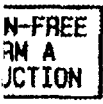 --, therefor.

In Column 21, Line 56, delete "SLAM" and insert -- SIAM --, therefor.

In Column 26, Line 67, delete "component:" and insert -- component. --, therefor.

In Column 27, Lines 59-60, delete "the be" and insert -- be --, therefor.

In Column 28, Line 54, delete "may, be" and insert -- may be --, therefor.

In Column 48, Line 32, in Claim 90, delete "Coopers's" and insert -- Cooper's --, therefor.

In Column 35, Line 27, delete "1977).is:" and insert -- 1977.) is: --, therefor.

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,653,229 B2  Page 1 of 1
APPLICATION NO. : 10/744882
DATED : January 26, 2010
INVENTOR(S) : Kaufhold et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1771 days.

Signed and Sealed this

Twenty-eighth Day of December, 2010

David J. Kappos
*Director of the United States Patent and Trademark Office*